United States Patent
Evans et al.

(10) Patent No.: US 10,692,287 B2
(45) Date of Patent: Jun. 23, 2020

(54) MULTI-STEP PLACEMENT OF VIRTUAL OBJECTS

(71) Applicant: Microsoft Technology Licensing, LLC, Redmond, WA (US)

(72) Inventors: David Anthony Evans, Bellevue, WA (US); Jason Bradley Scott, Newcastle, WA (US); Jedd Chevrier, Redmond, WA (US); John Copic, Bothell, WA (US); Jonathan Gustav Paulovich, Redmond, WA (US); Timothy James Schutz, Duvall, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 152 days.

(21) Appl. No.: 15/489,682

(22) Filed: Apr. 17, 2017

(65) Prior Publication Data

US 2018/0300952 A1  Oct. 18, 2018

(51) Int. Cl.
| | |
|---|---|
| *G06F 3/01* | (2006.01) |
| *G06T 19/00* | (2011.01) |
| *G06F 3/16* | (2006.01) |
| *G06F 3/0484* | (2013.01) |
| *G06F 9/451* | (2018.01) |
| *G06F 3/0481* | (2013.01) |

(52) U.S. Cl.
CPC ............ *G06T 19/006* (2013.01); *G06F 3/011* (2013.01); *G06F 3/013* (2013.01); *G06F 3/014* (2013.01); *G06F 3/017* (2013.01); *G06F 3/0484* (2013.01); *G06F 3/04815* (2013.01); *G06F 3/04842* (2013.01); *G06F 3/04845* (2013.01); *G06F 3/167* (2013.01); *G06F 9/453* (2018.02); *G06F 2203/04806* (2013.01); *G06T 2200/24* (2013.01)

(58) Field of Classification Search
CPC ..... G06F 9/44; G06F 3/01; G06F 3/16; G06F 3/0484
See application file for complete search history.

(56) References Cited

U.S. PATENT DOCUMENTS

| | | | |
|---|---|---|---|
| 7,996,793 | B2 | 8/2011 | Latta et al. |
| 8,830,809 | B2 | 9/2014 | Fujita |
| 9,400,553 | B2 | 7/2016 | Kerr et al. |
| 2002/0140708 | A1* | 10/2002 | Sauer ...................... G06F 3/011 345/633 |

(Continued)

OTHER PUBLICATIONS

Durrant-Whyte, et al., "Simultaneous Localisation and Mapping (SLAM): Part I The Essential Algorithms," in IEEE Robotics & Automation Magazine, vol. 13, No. 2, Jul. 2006, 9 pages.

(Continued)

*Primary Examiner* — David E Choi
(74) *Attorney, Agent, or Firm* — Rainier Patents, P.S.

(57) ABSTRACT

A technique is described herein for placing a virtual object within any type of modified-reality environment. The technique involves receiving the user's specification of plural values in plural stages. The plural values collectively define an object display state. The technique places the virtual object in the modified-reality environment in accordance with the object display state. Overall, the technique allows the user to place the virtual object in the modified-reality environment with high precision and low ambiguity by virtue of its guided piecemeal specification of the object display state.

22 Claims, 12 Drawing Sheets

(56) References Cited

U.S. PATENT DOCUMENTS

| | | | |
|---|---|---|---|
| 2002/0140709 A1* | 10/2002 | Sauer | G06F 3/011 |
| | | | 345/633 |
| 2008/0292131 A1* | 11/2008 | Takemoto | H04N 13/246 |
| | | | 382/100 |
| 2011/0109617 A1 | 5/2011 | Snook et al. | |
| 2012/0042036 A1 | 2/2012 | Lau et al. | |
| 2012/0162065 A1 | 6/2012 | Tossell et al. | |
| 2012/0212484 A1 | 8/2012 | Haddick et al. | |
| 2013/0106852 A1 | 5/2013 | Woodhouse et al. | |
| 2014/0137050 A1* | 5/2014 | Alhashash | G06F 17/50 |
| | | | 715/848 |
| 2014/0184550 A1 | 7/2014 | Hennessey et al. | |
| 2014/0306993 A1* | 10/2014 | Poulos | G06T 19/006 |
| | | | 345/633 |
| 2014/0354688 A1 | 12/2014 | Min et al. | |
| 2014/0375789 A1 | 12/2014 | Lou et al. | |
| 2015/0138613 A1 | 5/2015 | Choo et al. | |
| 2015/0145985 A1 | 5/2015 | Gourlay et al. | |
| 2015/0146271 A1 | 5/2015 | Lee et al. | |
| 2015/0221133 A1 | 8/2015 | Groten et al. | |
| 2015/0228114 A1 | 8/2015 | Shapira et al. | |
| 2015/0254905 A1 | 9/2015 | Ramsby et al. | |
| 2015/0301592 A1* | 10/2015 | Miller | G06F 3/011 |
| | | | 345/156 |
| 2015/0310666 A1 | 10/2015 | Meier et al. | |
| 2015/0378155 A1* | 12/2015 | Kuehne | G02B 27/017 |
| | | | 345/8 |
| 2016/0026242 A1 | 1/2016 | Burns et al. | |
| 2016/0027217 A1 | 1/2016 | da Veiga et al. | |
| 2016/0110917 A1 | 4/2016 | Iverson et al. | |
| 2016/0131902 A1 | 5/2016 | Ambrus et al. | |
| 2016/0147408 A1 | 5/2016 | Bevis et al. | |
| 2016/0179336 A1 | 6/2016 | Ambrus et al. | |
| 2016/0210780 A1 | 7/2016 | Paulovich et al. | |
| 2016/0210784 A1 | 7/2016 | Ramsby et al. | |
| 2016/0224103 A1* | 8/2016 | Kochi | G06F 3/011 |
| 2016/0307367 A1 | 10/2016 | Chuang et al. | |
| 2016/0364907 A1 | 12/2016 | Schoenberg | |
| 2017/0004649 A1 | 1/2017 | Collet Romea et al. | |
| 2017/0221273 A1* | 8/2017 | Haseltine | G06F 3/011 |
| 2017/0287222 A1* | 10/2017 | Fujimaki | G06T 19/006 |
| 2017/0287225 A1* | 10/2017 | Powderly | G06T 19/006 |
| 2018/0300952 A1* | 10/2018 | Evans | G06T 19/006 |

OTHER PUBLICATIONS

Bailey, et al., "Simultaneous Localization and Mapping (SLAM): Part II," in IEEE Robotics & Automation Magazine, vol. 13, No. 3, Sep. 2006, 10 pages.

Hughes, et al., Computer Graphics: Principles and Practices, 3rd Edition, Adison-Wesley publishers, 2014, pp. vii, viii, 14-19.

Aukstakalnis, Steve, Practical Augmented Reality: A Guide to the Technologies, Addison-Wesley Professional, 1st Edition, Sep. 18, 2016, Amazon.com product page only, available at «https://www.amazon.com», accessed on Nov. 28, 2016, 8 pages.

Liu, et al., "Viewing-Angle Enlargement in Holographic Augmented Reality Using Time Division and Spatial Tiling," in Optics Express, vol. 21, Issue 10, May 2013, 9 pages.

"Gestures," available at «https://developer.microsoft.com/en-us/windows/holographic/gestures», Windows Dev Center, Microsoft Corporation, Redmond, WA, retrieved on Apr. 17, 2017, 5 pages.

"Spatial mapping," available at «https://developer.microsoft.com/en-us/windows/holographic/spatial_mapping#raycasting_and_collision», Windows Dev Center, Microsoft Corporation, Redmond, WA, retrieved on Apr. 17, 2017, 12 pages.

"Dynamically generate holograms," available at «https://forums.hololens.com/discussion/1655/dynamically-generate-holograms», Windows Holographic Developer Forum, Microsoft Corporation, Redmond, WA, retrieved on Apr. 17, 2017, 5 pages.

Keller, et al., "Real-time 3D Reconstruction in Dynamic Scenes using Point-based Fusion," in Proceedings of the 2013 International Conference on 3D Vision, 2013, 8 pages.

Izadi, et al., "KinectFusion: Real-time 3D Reconstruction and Interaction Using a Moving Depth Camera," in Proceedings of the 24th Annual ACM Symposium on User Interface Software and Technology, Oct. 2011, 10 pages.

Chen, et al., "Scalable Real-time Volumetric Surface Reconstruction," in ACM Transactions on Graphics (TOG), vol. 32, Issue 4, Jul. 2013, 10 pages.

\* cited by examiner

MULTI-STEP PLACEMENT OF VIRTUAL OBJECTS

BACKGROUND

Some applications allow a user to manually specify the location of a virtual object within a mixed-reality environment. These applications, however, may provide poor user experience. For example, a user may select a location that appears to be correct from a first vantage point within the environment, based on the user's ad hoc judgment. But upon moving to a second vantage point, the user may discover that the chosen location is erroneous, or otherwise non-ideal.

SUMMARY

A technique is described herein for placing a virtual object within any type of modified-reality environment. The technique involves receiving the user's specification of plural values in plural stages. The plural values collectively define an object display state. The technique places the virtual object in the modified-reality environment in accordance with the object display state. Overall, by allowing a user to specify the object display state in a guided piecemeal manner, the technique allows a user to place the virtual object in the modified-reality environment with high accuracy and low ambiguity.

In one non-limiting example, the technique operates by receiving the user's selection of a first point on any surface in the modified-reality environment. The technique then displays a line in the modified-reality environment that extends from the first point, and is normal to the surface. The technique then receives the user's selection of a second point on the line. The second point defines the (x, y, z) placement of the virtual object. The technique may optionally solicit further selections from the user in one or more successive stages; those selections may define the size of the object, the rotation of the object about a specified axis, and/or any other property of the virtual object.

The above technique can be manifested in various types of systems, devices, components, methods, computer-readable storage media, data structures, graphical user interface presentations, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

Figure 1:
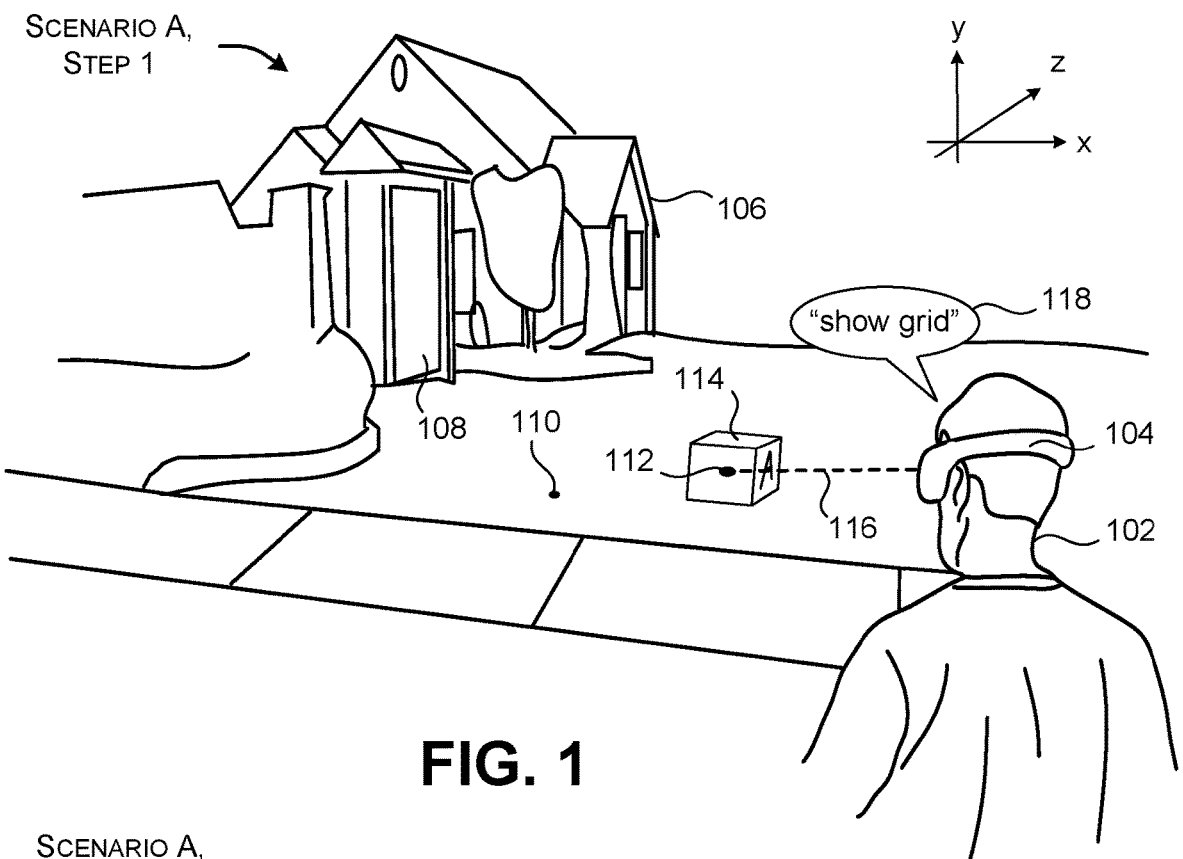
FIGS. 1-6 show successive stages in a user's specification of an object display state, in accordance with a first scenario.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes the operation of a computing device that allows a user to place a virtual object in a modified-reality environment. Section B describes one implementation of the computing device. Section C describes the operation of the computing device of Section B in flowchart form. And Section D describes illustrative computing functionality that can be used to implement any aspect of the features described in the preceding sections.

As a preliminary matter, some of the figures describe concepts in the context of one or more structural components, also referred to as functionality, modules, features, elements, etc. In one implementation, the various components shown in the figures can be implemented by software running on computer equipment, or other logic hardware (e.g., FPGAs), etc., or any combination thereof. In one case, the illustrated separation of various components in the figures into distinct units may reflect the use of corresponding distinct physical and tangible components in an actual implementation. Alternatively, or in addition, any single component illustrated in the figures may be implemented by plural actual physical components. Alternatively, or in addition, the depiction of any two or more separate components in the figures may reflect different functions performed by a single actual physical component. Section D provides additional details regarding one illustrative physical implementation of the functions shown in the figures.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). In one implementation, the blocks shown in the flowcharts can be implemented by software running on computer equipment, or other logic hardware (e.g., FPGAs), etc., or any combination thereof.

As to terminology, the phrase "configured to" encompasses various physical and tangible mechanisms for performing an identified operation. The mechanisms can be configured to perform an operation using, for instance, software running on computer equipment, or other logic hardware (e.g., FPGAs), etc., or any combination thereof.

The term "logic" encompasses various physical and tangible mechanisms for performing a task. For instance, each operation illustrated in the flowcharts corresponds to a logic component for performing that operation. An operation can be performed using, for instance, software running on computer equipment, or other logic hardware (e.g., FPGAs), etc., or any combination thereof. When implemented by computing equipment, a logic component represents an electrical component that is a physical part of the computing system, in whatever manner implemented.

Any of the storage resources described herein, or any combination of the storage resources, may be regarded as a computer-readable medium. In many cases, a computer-readable medium represents some form of physical and tangible entity. The term computer-readable medium also encompasses propagated signals, e.g., transmitted or received via a physical conduit and/or air or other wireless medium, etc. However, the specific terms "computer-readable storage medium" and "computer-readable storage medium device" expressly exclude propagated signals per se, while including all other forms of computer-readable media.

The following explanation may identify one or more features as "optional." This type of statement is not to be interpreted as an exhaustive indication of features that may be considered optional; that is, other features can be considered as optional, although not explicitly identified in the text. Further, any description of a single entity is not intended to preclude the use of plural such entities; similarly, a description of plural entities is not intended to preclude the use of a single entity. Further, while the description may explain certain features as alternative ways of carrying out identified functions or implementing identified mechanisms, the features can also be combined together in any combination. Finally, the terms "exemplary" or "illustrative" refer to one implementation among potentially many implementations.

A. Illustrative Use Scenarios

FIGS. 1-9 describe a technique by which a user 102 places a virtual object in a modified-reality environment. More specifically, FIGS. 1-6 describe a first application of the technique (corresponding to Scenario A), and FIGS. 7-9 describe a second application of the technique (corresponding to Scenario B). As used herein, the term "modified-reality" environment encompasses worlds that contain any combination of real content (associated with real objects in a physical environment) and virtual content (corresponding to machine-generated objects). For instance, a modified-reality environment may include worlds provided by augmented-reality (AR) technology (also referred to herein as mixed-reality (MR) technology), virtual-reality (VR) technology, augmented VR technology, etc., or any combination thereof.

AR technology provides an interactive world that includes a representation of the physical environment as a base, with any kind of virtual objects added thereto. The virtual objects can include text, icons, video, graphical user interface presentations, static scene elements, animated characters, etc. VR technology provides an interactive world that is entirely composed of virtual content. Augmented VR technology provides an interactive world that includes virtual content as a base, with real-world content added thereto. To nevertheless facilitate and simplify the explanation, most of the examples presented herein correspond to a user experience produced using AR technology. Section D provides additional information regarding representative technology for providing an AR user experience.

In each of FIGS. 1-9, assume that the user 102 interacts with a physical environment using a head-mounted display (HMID) 104. For example, as will be described in Section D, the HMD 104 can produce an AR environment by providing a representation of a physical environment, with one or more virtual objects added thereto. For instance, the HMD 104 can produce the AR environment using a partially-transparent display device. The user 102 may view the physical environment through the partially-transparent display device. The user 102 may also simultaneously view virtual objects that the HMD 104 projects onto the partially-transparent display device, which appear to the user 102 as if integrated into the physical environment. Alternatively, the HMD 104 can produce an AR environment by receiving image information that describes the physical environment, e.g., as captured by one or more video cameras. The HMD 104 can then integrate one or more virtual objects with the image information, to provide a combined scene. The HMD 104 can then project the combined scene to the user 102 via an opaque display device.

In yet other cases, the user 102 may interact with an AR environment using some other type of computing device, besides the HMD 104, or in addition to the HMD 104. For example, the user 102 may use a handheld computing device (such as a smartphone or tablet-computing device) to produce an AR environment. In one implementation, the handheld computing device includes one or more cameras having lenses disposed on a first side, and a display device having a display surface disposed on a second side, where the first and second sides are opposing sides. In operation, the user 102 may orient the handheld computing device such that its camera(s) capture image information that describes the physical environment. The handheld computing device can add one or more virtual objects to the image information to produce the AR environment. The handheld computing device presents the AR environment on its display device. To nevertheless facilitate explanation, assume in the following examples that the computing device that produces the AR environment corresponds to the HMD 104.

In the merely illustrative scenarios of FIGS. 1-9, the physical environment corresponds to a scene that includes at least a house 106, a community mailbox 108, and a driveway 110. Further assume that the user 102 intends to use the HMD 104 to add a virtual cube to the physical environment, thus producing an AR environment. More generally, the HMD 104 can produce an AR environment based on any physical environment having any spatial scope and any characteristics (including outdoor scenes, indoor scenes, or any combination thereof). Further, the HMD 104 can place any kind of virtual object into the scene, including a static object, an animated object, a graphical user interface presentation, an audiovisual media item, etc., or any combination thereof.

In still another case, the HMD 104 can place a virtual object that corresponds to a virtual marker. That virtual marker marks a location in the AR environment. In some cases, the HMD 104 may display a visual indicator in the AR environment that reveals the location of the virtual marker. But in other cases, the HMD 104 may omit such a visual indicator. An AR application may leverage the virtual marker for various purposes. For example, an AR application may display virtual content in proximity to the virtual marker, using the virtual marker as an anchor point.

Further note that FIGS. 1-9 show the AR environment as it would appear to the user 102 viewing it through the HMD 104. That AR environment is defined with respect to a world coordinate system having x, y, and z axes. Assume that the z axis describes a depth dimension of the scene, relative to the user 102. In other cases, the AR environment may be defined with respect to any other type of world coordinate system.

By way of overview, the HMD 104 places the virtual object (in this case, a virtual cube) in the AR environment on the basis of an object display state that the user 102 defines in successive steps. For example, the object display state can describe at least the (x, y, z) position of the virtual object in the world coordinate system. In some implementations, the object display state can also define the size of the virtual object. In some implementations, the object display state can also define the rotation of the virtual object about one or more specified axes. In some implementations, the object display state also can define the color, transparency level, interactive behavior, etc. of the virtual object. Each such aspect of the virtual object is referred to herein as a dimension, such as y-axis dimension. Each dimension of the object display state, in turn, takes on a dimension value, such as y=2.75 cm (where 2.75 correspond to the dimension value of the y-axis dimension).

Each step of the placement procedure provides value information that contributes to the object display state, either directly or indirectly. For instance, a step in the placement procedure provides value information that directly contributes to the object display state when that value information directly specifies a dimension value of the virtual object, such as its size, color, etc. A step in the placement procedure indirectly contributes to the object display state when that value information is used to derive a dimension value of the virtual object, but where that value information does not directly correspond to a dimension value itself. For instance, as will be described shortly, the first step of the placement procedure may specify a point on a surface. That point on the surface does not refer to the final placement of the virtual object, but is nevertheless leveraged in a following stage to identify the placement of the virtual object.

With respect to FIG. 1, the user 102 may begin the placement process by specifying a particular virtual object to be added to the AR environment, from among a set of candidate virtual objects. For example, assume that three types of virtual objects are available, corresponding to a cube, a sphere, and a pyramid. The user 102 may issue the command "set cube" to instruct the HMD 104 to display a virtual cube. The user 102 may issue the command "set sphere" to place the virtual sphere, and so on. The virtual object that is displayed may have default properties, such as a default size, default orientation, default color, etc. In another example, the HMD 104 can present a drop-down menu in the AR environment through which the user 102 may specify a desired virtual object, etc. Assume, as stated above, that the user selects a virtual cube to be added to the AR environment.

Next, the user 102 selects a first point on any surface of the AR environment. For example, assume that the user 102 selects a first point 112 on a generally planar surface that corresponds to the driveway 110. The HMD 104 may respond by provisionally placing a virtual cube 114 at the first point 112, e.g., centered at the first point 112 or directly above the first point 112.

More specifically, in one non-limiting approach, the HMD 104 uses a gaze detection engine (described in Section B) to determine the direction that the user is looking within the AR environment. The HMD 104 then projects a ray 116 into the AR environment, in the identified direction. The HMD 104 then identifies a point at which the ray 116 intersects a surface within the AR environment. Here, assume that the ray 116 intersects the driveway 110 at the first point 112. In one implementation, the user can move the virtual object 114 to different locations on the driveway 110 by looking at different points on the driveway's surface.

The HMD 104 can detect the user's formal confirmation of the point 112 in various ways. For example, the HMD 104 can use a body-movement detection engine to detect a telltale gesture performed by the user, such as an air tap. In response, the HMD 104 will formally capture value information that identifies the fact that the user has selected the point 112, and that the point 112 lies on a particular surface in the AR environment. The HMD 104 stores that value information in a data store. Note that this value information does not necessarily directly specify a dimension of the object display state, because it does not necessarily specify the final placement of the virtual object 114.

The HMD 104 can use other input modes to identify a point in the AR environment (besides the gaze detection technique, or in addition to the gaze detection technique). For example, in another approach, the HMD 104 can use a body-movement detection engine to determine a direction in which the user 102 is pointing in the AR environment, e.g., using an extended arm and/or finger.

In other approach, the HMD 104 can use a controller input detection engine to receive control signals emitted by a controller, which the user 102 manipulates separately from the HMD 104. For example, the controller input detection engine can interpret the control signals to determine the direction that the user 102 is pointing the controller within the AR environment. The HMD 104 can also use the controller input detection engine to receive the user's confirmation of a selection point, e.g., when the user 102 activates a selection button on the controller or performs a telltale gesture using the controller, etc.

In another approach, the HMD 104 can use a voice command recognition engine to interpret voice commands made by the user 102. For example, assume that the driveway 110 has been previously annotated with the keyword "driveway." The user 102 may select the driveway by speaking the command "select driveway" or the like. The HMD 104 can also receive the user's confirmation of a selected point via a voice command, as when the user speaks the command "set point" or the like.

The HMD 104 may operate in conjunction with yet other input modes. However, to simplify explanation, FIGS. 1-9 show the case in which the user 102 chooses a point in the AR environment by training his gaze on that point, and thereafter confirms the selected point using a hand gesture (e.g., an air tap) or a voice command.

Figure 2:
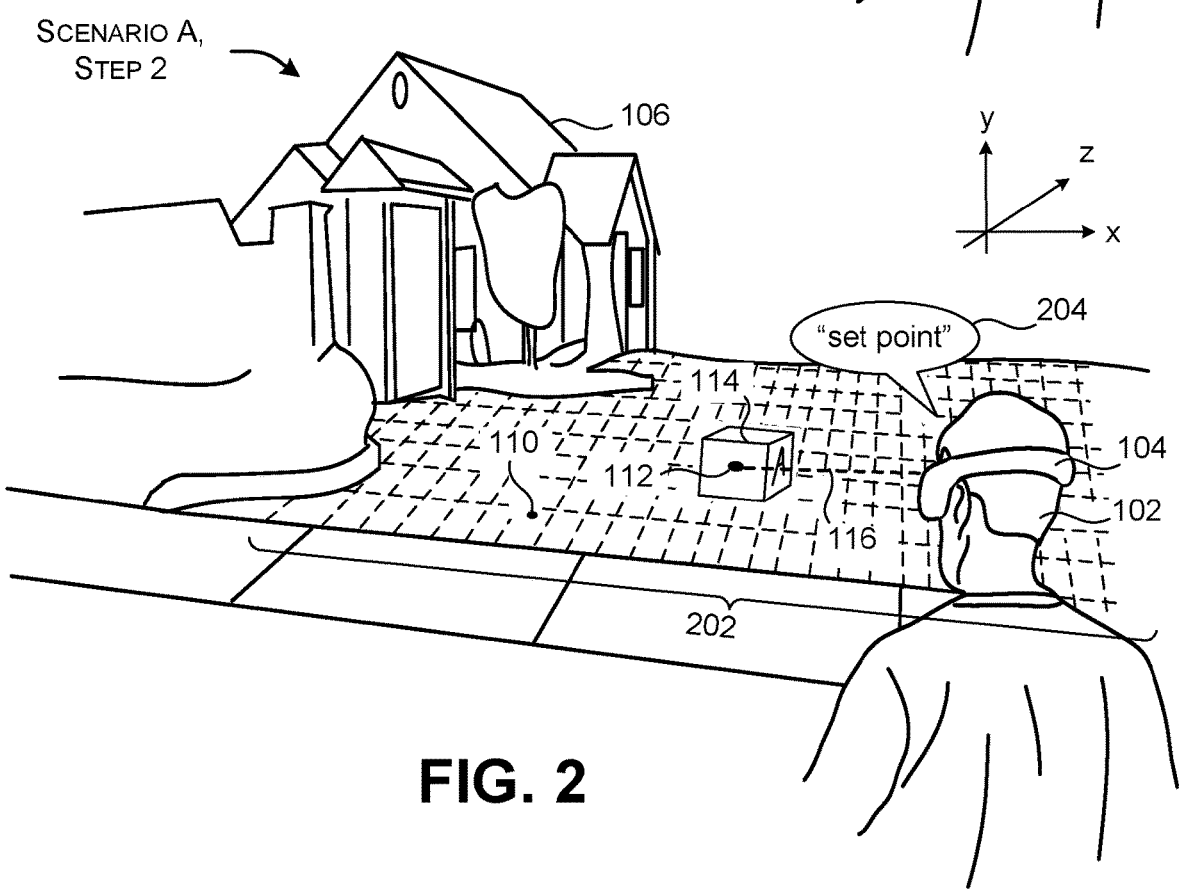

Rather than commit to the point 112 at this time, assume that the user 102 in the scenario of FIG. 1 issues the voice command, "show grid" 118. In response, as shown in FIG. 2, the HMD 104 displays a grid 202 over whatever surface is selected by the user 102 at the current time—here, corresponding to the driveway 110.

The grid 202 includes intersecting orthogonal grid lines. The intersection of any two grid lines defines a discrete selection point. At any given time, the HMD 104 snaps the ray 116 defined by the user's gaze to the nearest intersection of two grid lines. Overall, the grid 202 constitutes an initial guide that assists the user 102 in visualizing a collection of viable selection points on the selected surface, and for selecting a desired selection point from that collection. At this juncture, assume that the user 102 selects the first point 112 by performing a hand gesture (such as an air tap) or issuing the voice command "set point" 204.

In an alternative case, the HMD 102 can pre-populate the AR environment with one or more grids. For instance, the HMD 102 can place grids over all of the AR environment's surfaces, or just its principal surfaces, where the principal surfaces may correspond to surfaces having areas above a prescribed threshold. This strategy eliminates the need for the user 102 to request a grid after selecting a surface (as in the example of FIG. 1). The user 102 may thereafter select any surface in the manner described in FIG. 1, e.g., by gazing at the desired surface.

Figure 3:
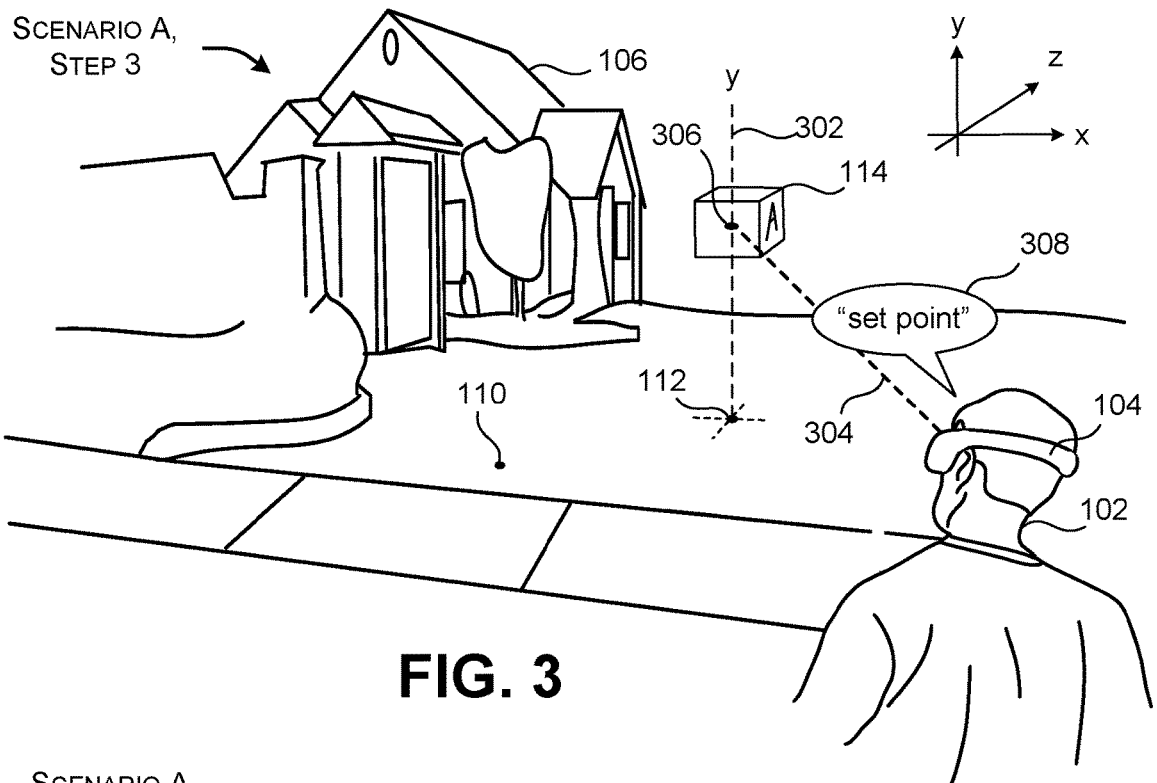

Advancing to FIG. 3, the HMD 104 next displays a line 302 which extends from the first point 112. The line 302 is normal to the surface of the driveway 110, at the first point 112. More specially, in this merely illustrative example, the driveway 110 generally conforms to a plane defined by the x and z axes of the world coordinate system. The line 302 extends from the driveway 110, generally in the direction of the y axis. In other examples, the selected surface can have any contour, including a variable contour of any complexity. Further, the selected surface can have any orientation within the AR environment; for instance, the surface need not run parallel to any of the axes of the world coordinate system.

Next, the user 102 trains his gaze on a desired location on the line 302 at which he wishes to place a virtual object. The gaze detection engine detects the direction of the user's gaze, projects a ray 304 in the identified direction, and determines a point 306 at which the ray intersects the line 302. The point 306 is referred to as a second point herein to help distinguish it from the previously-selected first point 112 on the driveway 110. The user 102 may confirm that the second point 306 is correct by performing an air tap or speaking a command "set point" 308, etc. The line 302 may be regarded as a guide insofar as it assists the user 102 in selecting a y-axis dimension-value.

The HMD 104 simultaneously moves the virtual object 114 from its initial position on the driveway 110 to the newly selected point 306. More generally, the HMD 104 can move the virtual object 114 in lockstep with the user's gaze along the line 302. When the user 102 moves his gaze upward along the line 302, the HMD 104 moves the virtual object 114 upward; when the user 102 moves his gaze downward along the line 302, the HMD 104 moves the virtual object 114 downward.

In one implementation, the HMD 104 can assist the user 102 in selecting the point 306 on the line 302 by locking the range of the user's selection possibilities to the line 302. In other words, the HMD 104 may permit the user 102 to move the ray 304 defined by the user's gaze up and down along the y axis, but not in any other direction. In yet another case, the HMD 104 can perform this axis-locking behavior without explicitly displaying the line 302. In other words, the HMD 104 can be said to provide the line 302 as a guide, but not provide a visual indicator associated with the line.

In response to the user's selection of the second point 306, the HMD 104 stores value information in the data store that specifies the final placement of the virtual object 306, with respect to the x, y, and z axes. This value information directly specifies dimension values of the object display state.

The user 102 may terminate the placement process at this juncture, e.g., by speaking the voice command "done."

Alternatively, the user 102 may continue to refine the object display state of the virtual object 114 in one or more additional steps. Assume here that the user 102 decides to continue by specifying other properties of the virtual object 114.

Figure 4:
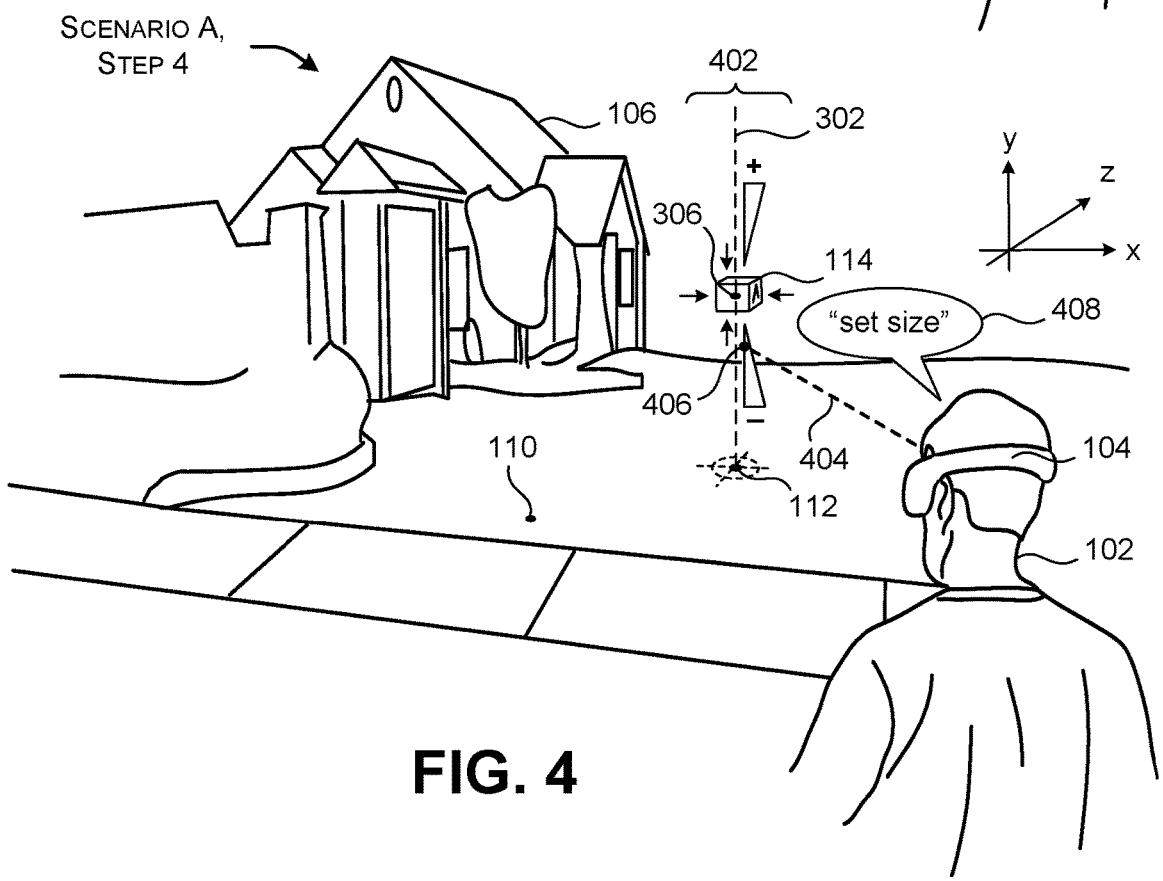

FIG. 4 shows one technique by which the user 102 may optionally modify the size of the virtual object 114 in a subsequent step. The HMD 104 begins by displaying a size-adjustment guide 402. In one non-limiting case, the size-adjustment guide 402 corresponds to a slider-type control having a range of selection points along the line 302. The second point 306 defines a zero-value origin point within the range, and is henceforth referred to by that name. That is, the size-adjustment guide 402 includes a first subset of selection points located above the origin point 306 that correspond to positive-value selection points. The size-adjustment guide 402 includes a second subset of selection points located below the origin point 306 that correspond to negative-value selection points. The user 102 may select any selection point in these subsets in any manner, e.g., by gazing at the desired selection point. In the example of FIG. 4, assume that a ray 404 cast by the user's gaze intersects the size-adjustment guide 402 at selection point 406, corresponding to a negative selection point. As in the case of FIG. 3, the HMD 104 can also snap the ray 404 to they axis, allowing the user 102 to select only points on the y axis.

In one non-limiting implementation, the user's selection of the point 406 causes the virtual object 114 to gradually decrease in size at a rate that is dependent on the distance of the point 406 from the origin point 306. Hence, the user 102 may choose a small rate of decease choosing a selection point that is relatively close to the origin point 306. The user 102 may choose a large rate of decrease by choosing a selection point that is relatively far from the origin point 306. In a like manner, the user 102 may choose a desired rate of enlargement by choosing an appropriate selection point above the origin point 306, along the y axis.

The user 102 may stop the decrease or increase in the size of the object at any given time by making an appropriate hand gesture or by issuing an appropriate voice command, e.g., as in the "set size" command 408. In response, the HMD 104 stores value information in the data store that defines a selected size of the object. For instance, the HMD 104 can store a reduction/magnification factor that defines an extent to which the user 102 has shrunk or enlarged the virtual object 114, relative to a default size of the virtual object 114.

The size-adjustment guide 402 described above is advantageous because the user 102 can change the size of the virtual object 114 while simultaneously maintaining his focus of attention on a region in the AR environment surrounding the origin point 306. The size-adjustment guide 402 also allows the user 102 to quickly select the approximate size of the virtual object 114 by choosing a large rate of change; the user 108 may then fine-tune the size of the virtual object 114 by choosing a small rate of change. Thus, the size-adjustment guide 402 is both efficient and capable of high precision.

The HMD 104 may accommodate other techniques by which a user 102 may change the size of the virtual object 114. For instance, the size-adjustment guide 402 can alternatively include gradations in the positive and negative directions (relative to the origin point 306), each of which defines a percent of enlargement or reduction of the virtual object 114, respectively. The user 102 may choose a desired increase or decrease in size by choosing an appropriate selection point along this scale.

In another technique, the user 102 may execute a pointing gesture with his hand (or with a controller) to choose a desired point on the virtual object 114. The user 102 may execute another hand gesture to drag the chosen point away from the point 306. The HMD 104 responds by enlarging the virtual object 114. Alternatively, the user 102 may drag the chosen point toward the point 306, causing the HMD 104 to reduce the size of the virtual object 114.

In another technique, the user 102 may issue a voice command to change the size of the virtual object 114, such as by speaking the command "enlarge by ten percent." The HMD 104 may accommodate still other ways of changing the size of the virtual object 114; the above-described examples are presented in the spirit of illustration, not limitation.

Figure 5:
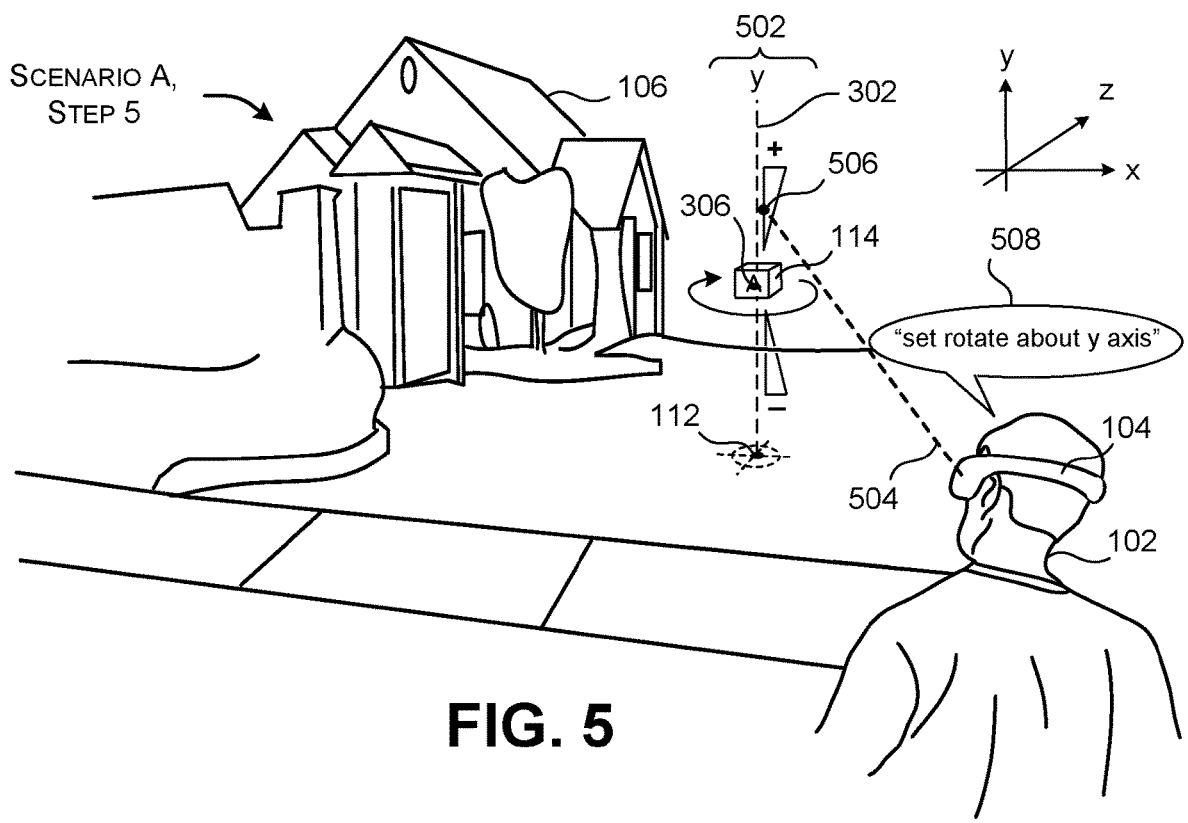

Advancing to FIG. 5, assume that the user 102 now wishes to change the rotation of the virtual object 114 about they axis. The HMD 104 assists the user 102 in performing this task by presenting a rotation-adjustment guide 502. In one implementation, the rotation-adjustment guide 502 works based on the same principle as the size-adjustment guide 402 described above. That is, the rotation-adjustment guide 502 includes a range of selection points along the y axis, including a subset of positive points which extend above the origin point 306, and a subset negative selection points that extend below the origin point 306. The user 102 may select a desired selection point within these subsets by gazing it in manner described above. Assume in the example of FIG. 5 that a ray 504 defined by the user's gaze intersects the y axis at a selection point 506, corresponding to a positive selection point.

The HMD 104 responds to the user's selection by rotating the virtual object 114 about the y axis in a positive direction at a rate that depends on the distance between the selection point 506 and the origin point 306. The user 102 can choose a desired rate of change in the opposite direction by choosing an appropriate selection point that lies below the origin point 306.

The user 102 may stop the rotation of the virtual object 114 at any desired angle by making an appropriate hand gesture or by issuing an appropriate voice command (e.g., as in the command "set rotate about y axis" 508). In response, the HMD 104 stores value information in the data store that defines the chosen rotation of the object about the y axis.

The HMD 104 can also allow the user 102 to rotate the virtual object 114 in other ways. For example, the rotation-adjustment guide 502 can alternatively include a series of gradations ranging from 0 to 180 in a positive direction, and 0 to −180 in a negative direction, relative to the origin point 306. The user 102 may choose a desired rotation angle by choosing an appropriate selection point on the rotation-adjustment guide.

In another technique, the user 102 may execute a pointing gesture with his hand (or with a controller) to choose a desired point on the virtual object 114. The user 102 may then execute another gesture to drag the chosen point around the y axis in a desired direction. In another technique, the HMD 104 can allow the user 102 to rotate the virtual object 114 by issuing appropriate voice commands, such as the command "rotate ten degrees clockwise," etc.

Further note that the HMD 104 can include one or more additional rotation-selection steps. Each such step allows the user 102 to rotate the virtual object 114 about another axis, besides y axis. Each such step may use any of the input-collection strategies described above, e.g., by presenting the kind of rotation-adjustment guide 502 shown in FIG. 5, but with respect to an axis other than y axis.

In yet another case, the HMD 104 may allow the user 102 to choose the axis about rotation is performed. For example, the user can move the line 302 (that defines the axis of rotation) such that it has any orientation within the AR environment, while still passing through the origin point 306.

Figure 6:
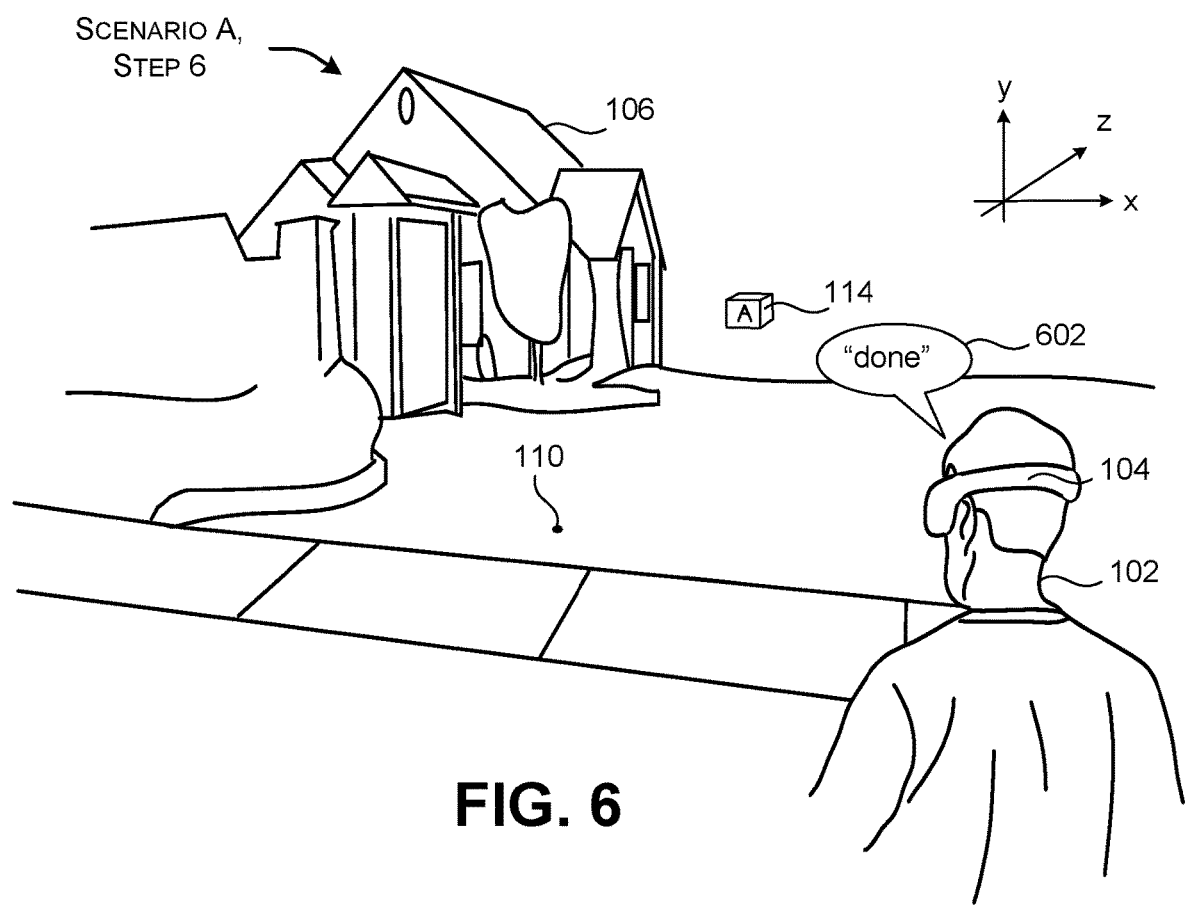

FIG. 6 shows a final stage in the placement strategy. Here, the user 102 issues the command "done" 602 or the like. The HMD 104 interprets this command as an indication that the user 102 is finished specifying the object display state. At this juncture, the AR environment displays the virtual object 114 having a desired (x, y, z) placement with respect to the world coordinate system, a desired size, and a desired rotation about one or more axes. As noted above, in other implementations, the user 102 can also define other properties of the virtual object 114, such as its color, transparency level, etc.

Overall, the HMD 104 can allow the user 102 to define the object display state with high precision. The HMD 104 achieves this level of accuracy by decomposing the placement task into multiple steps (e.g., two or more steps). At each step, the HMD 104 provides a guide to the user 102. The guide enables the user 102 to specify value information in an unambiguous manner; the clarity of this operation ensues, in part, from the fact that (1) the user 102 is tasked, at any given time, with describing only part of the final object display state, not all of the object display state, and (2) the guide allows the user to specify that part with a high degree of clarity and precision. This strategy eliminates the need for the user 102 to make an ad hoc single-step judgment regarding the proper location at which a virtual object should be placed in the AR environment; such a technique is fraught with error, particularly in those instances in which the user 102 seeks to place the virtual object in empty space. For instance, the user may make such a single-step selection that appears to be correct from a first vantage point, only to discover that the selection is erroneous when viewed from a second vantage point.

In some implementations, the HMD 104 further achieves good user experience by applying a small set of control mechanisms across plural steps. The control mechanisms are visually and behaviorally consistent. For example, the HMD 104 presents guides in FIGS. 3, 4 and 5 that require the user 102 to select a point along the y axis. The user may make such a selection by gazing along the y axis, and confirming his final selection with an air tap or the like. This consistency across multiple steps makes it easy for the user 102 to learn and use the control mechanisms.

Figure 7:
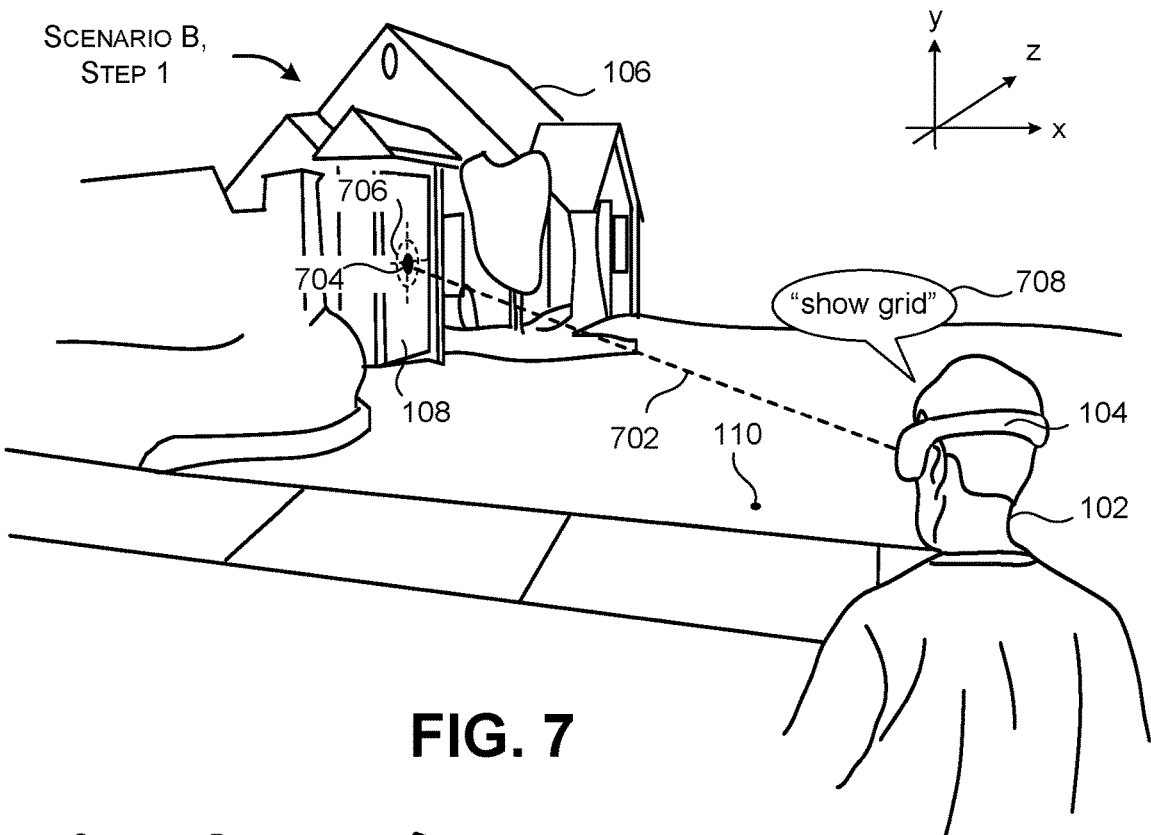
FIGS. 7-9 show successive stages in a user's specification of an object display state, in accordance with a second scenario.
Figure 8:
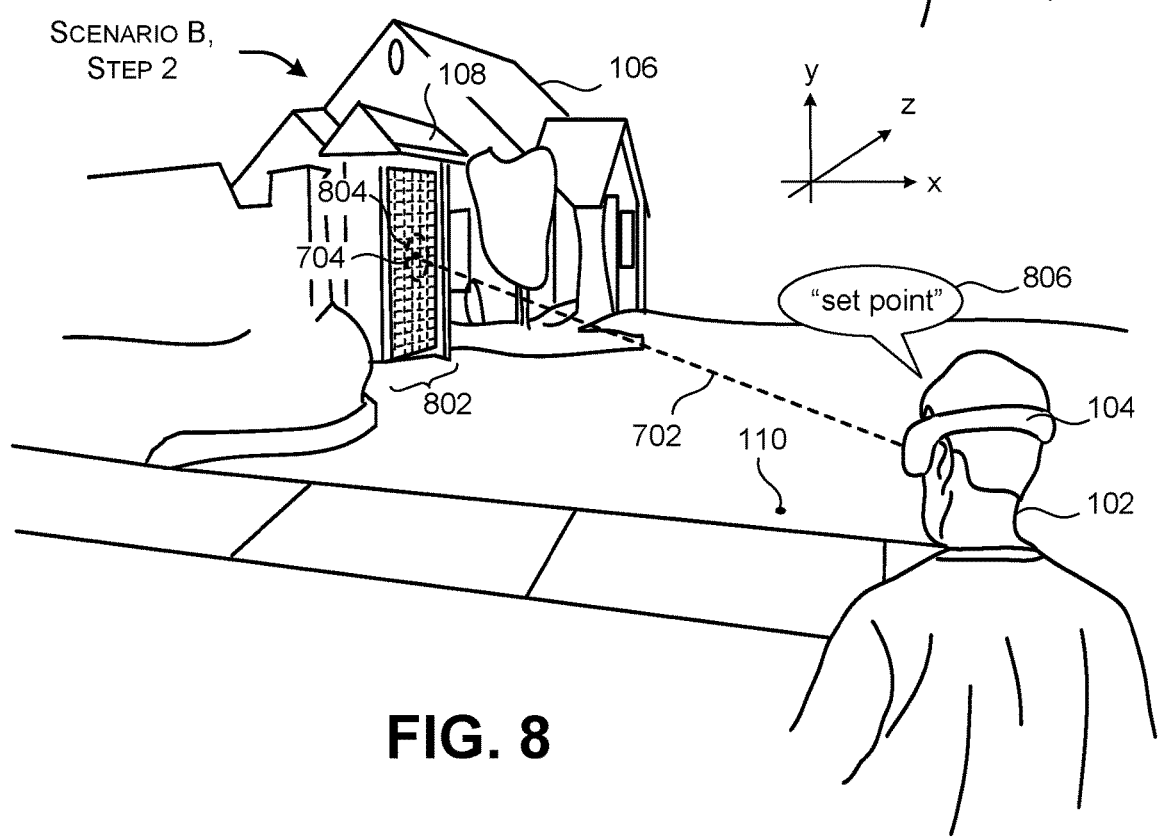
Figure 9:
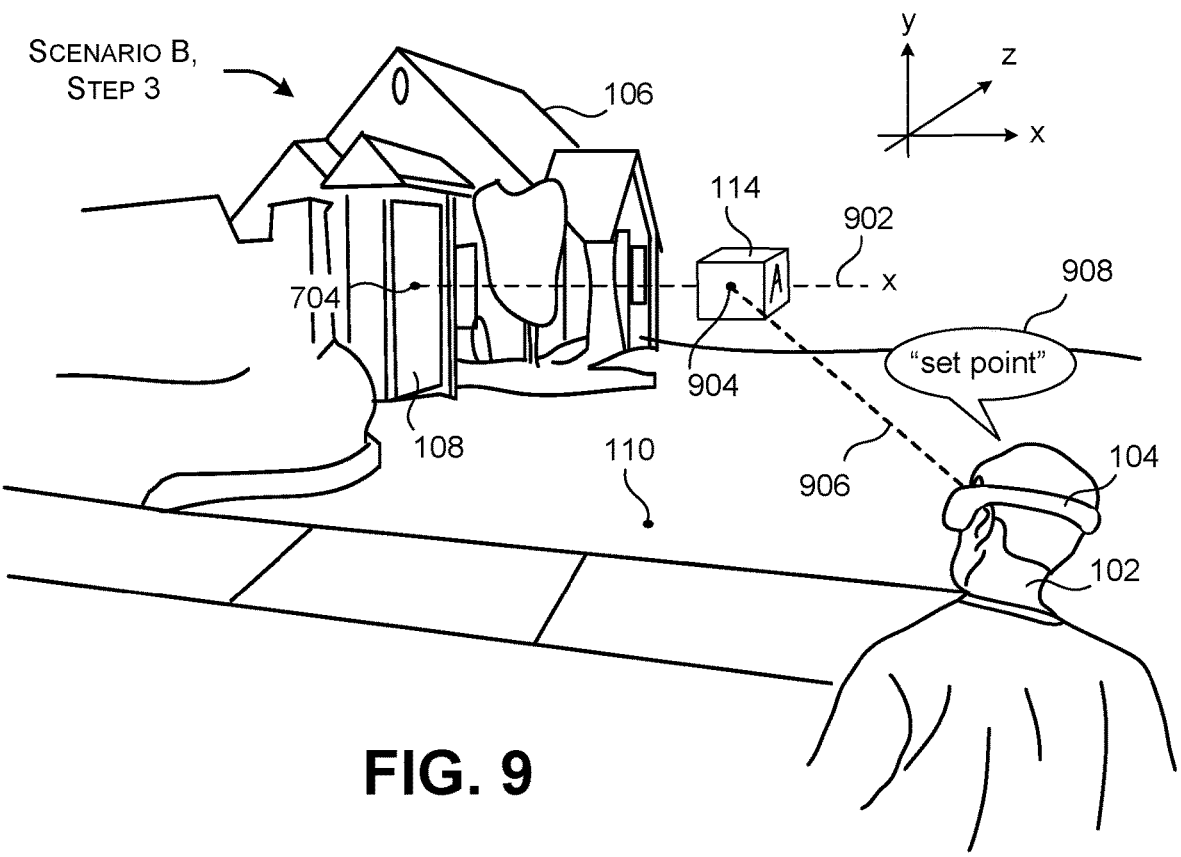

FIGS. 7-9 show a second scenario (Scenario B) that involves the same sequence of steps as FIGS. 1-3. But in Scenario B, the user 102 initially selects a different starting surface compared to Scenario A. That is, in Scenario A, the user 102 selects the driveway 110 as the starting surface. In Scenario B, by contrast, the user 102 selects a generally planar surface defined by the community mailbox 108 as a starting surface. Further, Scenario B describes a case in which the HMD 102 collects some value information prior to displaying the virtual object 114.

More specifically, in FIG. 7, assume that the user 102 trains his gaze on the community mailbox 108. The HMD 104 uses its gaze detection engine to detect the user's gaze, project a ray 702 in the direction the user's gaze, and determine that the ray 702 intersects the community mailbox 108. More specifically, assume that the ray 702 intersects the surface of the community mailbox 108 at a point 704.

In one implementation, the HMD 104 may display a cursor 706 that shows the location at which the user's gaze intersects a surface in the AR environment at any given time. The cursor 706 correspond to one manifestation of an initial guide that assists the user 102 is selecting a desired point on a desired surface. The user 102 may confirm his selection of the point 704 at any given time by making an air tap or issuing the voice command "set point," etc. Instead, assume that the user 102 issues the voice command "show grid" 708.

As shown in FIG. 8, in response to the user's voice command, the HMD 104 displays a grid 802 over the surface of the community mailbox 108. Here, the selected surface generally runs parallel to the y-z plane, rather than the x-z plane as in the example of Scenario A. The grid 802 includes a plurality of selection points defined by the intersections of its grid lines. At any given time, the HMD 104 snaps the ray 702 defined by the user's gaze to the nearest intersection of two grid lines. The HMD 104 may also present a cursor 804 that visually conveys the user's currently selected point, snapped to the nearest intersection of grid lines. Overall, the grid 802 and cursor 804 constitute an initial guide that assists the user 102 in visualizing the locations of viable selection points on a surface, and for selecting a desired selection point.

Assume that the user 102 next makes a hand gesture or issues a voice command 806 to formally select the point 704. In response, the HMD 104 stores value information in the data store that defines the point 704 selected by the user, and the surface on which the point 704 lies.

Advancing to FIG. 9, the HMD 104 now displays a line 902 that extends from the point 704, normal to the surface defined by the community mailbox 108 at the point 704. Here, the line 902 constitutes a guide that extends in the direction of the x axis. The user 102 may then use any of the strategies described above to select a point 904 on the line 902. For example, the user 102 may train his gaze (corresponding to ray 906) to a desired point along the line 902. The user 102 may confirm his selection of the desired selection by making an air tap or issuing the voice command "set point" 908. In response, the HMD 104 stores value information that defines the final x, y, z placement of the virtual object 114.

Finally, the HMD 104 may present the virtual object 114 at a location defined by the object display state. In other words, in this scenario, the HMD 104 defers displaying the virtual object 114 until the user specifies its final position.

Although not shown, the user 102 may continue to define the properties of the virtual object 910 in any of the ways described above with respect to Scenario A, e.g., by adjusting the size of the virtual object 910, and/or by adjusting the rotation of the virtual object 910 about one or more axes.

Figure 10:
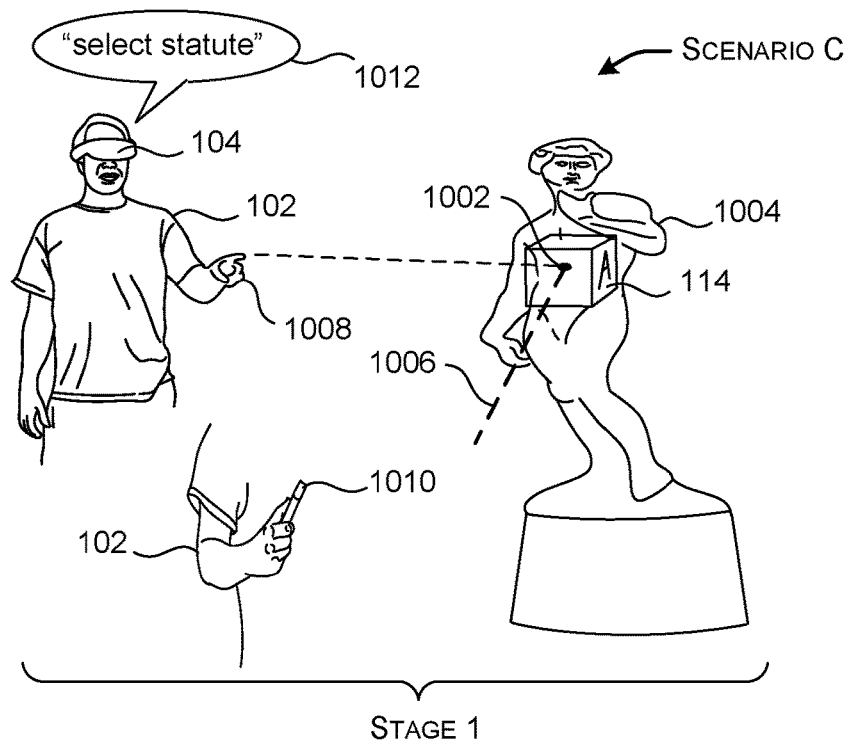
FIG. 10 shows variations with respect to the scenarios shown in FIGS. 1-9.

FIG. 10 shows a scenario (Scenario C) that varies from the above-described Scenarios A and B in three different respects. As a first variation, assume that the user 102 begins the process, in a first stage, by selecting a point 1002 on a surface of a statue 1004. The surface of the statue 1004 corresponds to a complexly-curved surface, rather than the generally planar surfaces of Scenarios A and B. In response to the user's selection, the HMD 104 projects a line 1006 that extends from the surface of the statue 1004, normal to the point 1002 that has been selected by the user 102.

The HMD 104 immediately displays the virtual object 114 when the user selects the point 1002. For instance, in the first stage, the HMD 104 initially positions the virtual object 114 so that it rests on the surface of the statue 1004, above the point 1002, or is centered on the point 1002. Thereafter, the user 102 may move the virtual object 114 out along the line 1006 using the same technique shown in FIG. 3.

As a second variation, FIG. 10 illustrates that the user 102 may use alternative techniques to interact with the HMD 104, rather than, or in addition to, the above-described gaze detection technique. In one technique, in the first stage, the user 102 uses a pointing gesture (using a hand 1008) to select the point 1002 on the surface of the statue 1004 (that is, by pointing at the point 1002). In addition, the user 102 may use a selection gesture (using his hand 1008) to confirm the selection of the point 1002, e.g., by performing an air tap gesture. The HMD's body-movement gesture engine can detect both of these kinds of gestures.

In another technique, in the first stage, the user 102 may manipulate a controller 1010 to select the point 1002 on the surface of the statue 1004, e.g., by pointing to the statue 1004 with the controller 1010. In addition, the user 102 may use the controller 1010 to confirm the selection of the point 1002, e.g., by actuating a selection button on the controller 1010, or by performing a telltale gesture that involves moving the controller 1010. In some implementations, the controller 1010 includes an inertial measurement unit (IMU) that that is capable of determining the position, orientation and motion of the controller 1010 in the AR environment with six degrees of freedom. The controller 1010 may include any combination of one or more accelerometers, one or more gyroscopes, one or more magnetometers, etc. In addition, the controller 1010 can incorporate other position-determining technology for determining the position of the controller 1010, such as a global positioning system (GPS) system, a beacon-sensing system, a wireless triangulation system, a dead-reckoning system, a near-field-communication (NFC) system, etc., or any combination thereof. The HIVID's controller input detection engine can interpret the control signals provided by the controller 1010 to detect the user's actions in selecting and/or confirming the point 1002.

In yet another approach, in the first stage, the user 102 may issue voice commands to select the point 1002 and/or to confirm the point 1002. For example, the user 102 may issue the voice command "select statue" 1012 to select the surface of the statue 1004, presuming that the statue 1004 has been previously tagged with the keyword "statue." The HMD's voice command recognition engine detects the user's voice commands.

As a third variation, the HMD 104 may allow the user 102 to select dimension values in an order that differs from that described above with respect to Scenarios A and B. For example, Scenario A indicates that the user 102 chooses the size of the virtual object 114 (as in FIG. 4) prior to choosing the rotation of the virtual object 114 (as in FIG. 5). But the user 102 may alternatively define the rotation of the virtual object 114 prior to its size. In yet another case, the user 102 may choose the size and/or rotation of the virtual object 114 with respect to an initial default position at which the HMD 104 presents the virtual object 114; thereafter, the user 102 may move the virtual object 114 to its final position using the multi-step approach described in FIGS. 1-3. In some implementations, the user 102 may initiate a particular step in the multi-step placement procedure by issuing an appropriate command, such as by issuing the voice command "choose size" to initiate the size-collection process shown in FIG. 4, and issuing the voice command "choose rotation about y axis" to initiate the rotation-collection process shown in FIG. 5.

B. Illustrative Computing Device for Placing a Virtual Object

Figure 11:
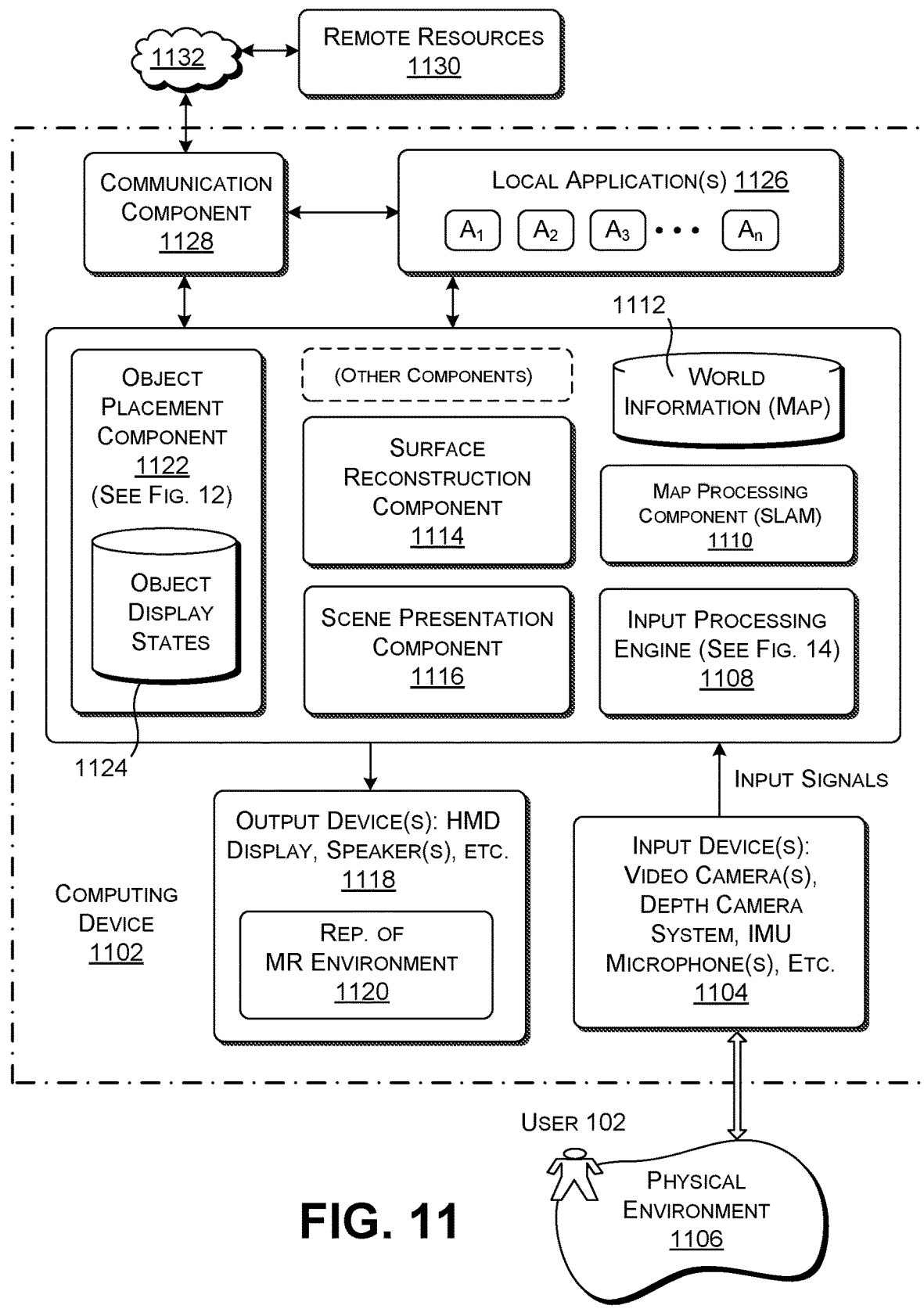
FIG. 11 shows one implementation of a computing device that provides a modified-reality experience, and which can deliver the user experiences shown in FIGS. 1-9.

FIG. 11 shows a computing device 1102 for implementing the scenarios shown in FIGS. 1-10. For example, the computing device 1102 may correspond to the kind of head-mounted display (HMD) shown in FIG. 17 (described in Section D). In other implementations, the computing device 1102 may correspond to a handheld computing device or some other type of computing device (besides an HMD, or in addition to an HIVID).

The computing device 1102 includes a collection of input devices 1104 for interacting with a physical environment 1106, such as the scene depicted in FIGS. 1-9. The input devices 1104 can include, but are not limited to: one or more environment-facing video cameras, an environment-facing depth camera system, a gaze-tracking system, an inertial measurement unit (IMU), one or more microphones, etc. Each video camera may produce red-green-blue (RGB) image information. The depth camera system produces image information in the form of a depth map using any kind of depth-capturing technology, such as a structured light technique, a stereoscopic technique, a time-of-flight technique, and so on. The depth map is composed of a plurality of depth values, where each depth value measures the distance between a scene point in the AR environment and a reference point (e.g., corresponding to the location of the computing device 1102 in the environment 1106).

In one implementation, the IMU can determine the movement of the computing device 1102 in six degrees of freedom. The IMU can include one or more accelerometers, one or more gyroscopes, one or more magnetometers, etc. In addition, the input devices 1104 can incorporate other position-determining technology for determining the position of the computing device, such as a global positioning system (GPS) system, a beacon-sensing system, a wireless triangulation system, a dead-reckoning system, a near-field-communication (NFC) system, etc., or any combination thereof.

The gaze-tracking system can determine the position of the user's eyes and/or head. The gaze-tracking system can determine the position of the user's eyes, by projecting light onto the user's eyes, and measuring the resultant glints that are reflected from the user's eyes. Illustrative information regarding the general topic of eye-tracking can be found, for instance, in U.S. Patent Application No. 20140375789 to Lou, et al., published on Dec. 25, 2014, entitled "Eye-Tracking System for Head-Mounted Display." The gaze-tracking system can determine the position of the user's head based on IMU information supplied by the IMU (that is, in those cases in which the computing device 1102 corresponds to an HMD that is worn by the user's head).

Figure 14:
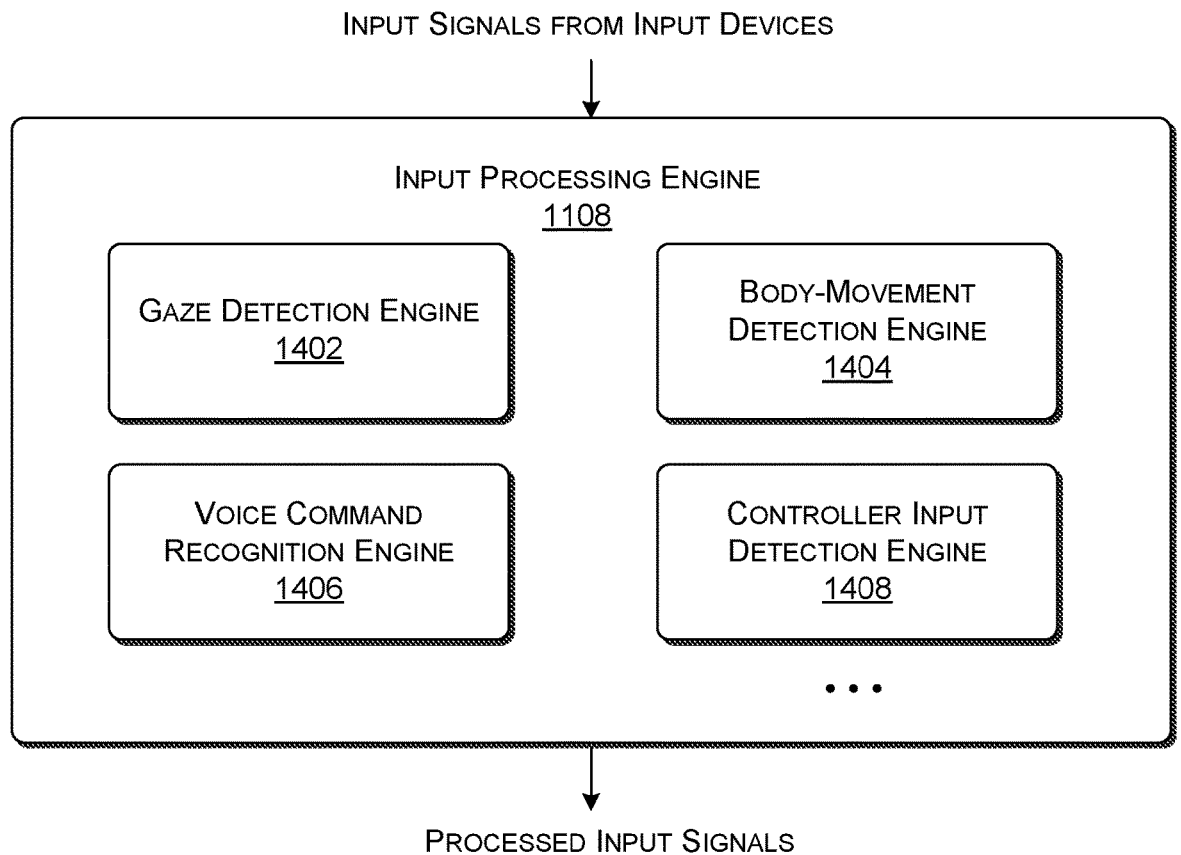
FIG. 14 shows one implementation of an input processing engine, which is another element of the computing device of FIG. 11.

An input processing engine 1108 performs any type of processing on the raw input signals fed to it by the input devices 1104. For example, the input processing engine 1108 can identify an object that the user 102 is presumed to be looking at in the AR environment by interpreting input signals supplied by the gaze-tracking system. The input processing engine 1108 can also identify any bodily gesture performed by the user 102 by interpreting inputs signals supplied by the video camera(s) and/or depth camera system, etc. The input processing engine 1108 can also interpret any voice commands issued by the user 102 by analyzing audio input signals supplied by the microphone(s). The input processing engine 1108 can also interpret any control signal provided by a controller, which is manipulated by the user 102. FIG. 14 provides additional information regarding one implementation of the input processing engine 1108.

In some implementations, an optional map processing component 1110 may create a map of the physical environment 1106, and then leverage the map to determine the location of the computing device 1102 in the physical environment 1106. A data store 1112 stores the map, which also constitutes world information that describes at least part of the AR environment. The map processing component 1110 can perform the above-stated tasks using Simultaneous Localization and Mapping (SLAM) technology. The SLAM technology leverages image information provided by the video cameras and/or the depth camera system, together with IMU information provided by the IMU.

As to the localization task performed by the SLAM technology, the map processing component 1110 can attempt to localize the computing device 1102 in the environment 1106 by searching a current instance of the captured image information to determine whether it contains any image features specified in the map, with respect to a current state of the map. The image features may correspond, for instance, to edge detection points or other salient aspects of the captured image information, etc. The search operation yields a set of matching image features. The map processing component 1110 can then identify the current position and orientation of the computing device 1102 based on the matching image features, e.g., by performing a triangulation process. The map processing component 1110 can repeat the above-described image-based location operation at a first rate.

Between individual instances of the above-described image-based location operation, the map processing component 1110 can also compute the current position and orientation of the computing device 1102 based on current IMU information supplied by the IMU. This IMU-based location operation is less data-intensive compared to the image-based location operation, but potentially less accurate than the image-based location operation. Hence, the map processing component 1110 can perform the IMU-based location operation at a second rate that is greater than the first rate (at which the image-based location operation is performed). The image-based location operation corrects any errors that have accumulated in the IMU-based location operation.

As to the map-building task of the SLAM technology, the map processing component 1110 can identify image features in the current instance of captured image information that have no matching counterparts in the existing map. The map processing component 1110 can then add these new image features to the current version of the map, to produce an updated map. Over time, the map processing component 1110 progressively discovers additional aspects of the environment 1106, and thus progressively produces a more detailed map.

In one implementation, the map processing component 1110 can use an Extended Kalman Filter (EFK) to perform the above-described SLAM operations. An EFK maintains map information in the form of a state vector and a correlation matrix. In another implementation, the map processing component 1110 can use a Rao-Blackwellised filter to perform the SLAM operations. Background information regarding the general topic of SLAM can be found in various sources, such as Durrant-Whyte, et al., "Simultaneous Localisation and Mapping (SLAM): Part I The Essential Algorithms," in IEEE Robotics & Automation Magazine, Vol. 13, No. 2, July 2006, pp. 99-110, and Bailey, et al., "Simultaneous Localization and Mapping (SLAM): Part II," in IEEE Robotics & Automation Magazine, Vol. 13, No. 3, September 2006, pp. 108-117.

Alternatively, the computing device 1102 can receive a predetermined map of the physical environment 1106, without the need to perform the above-described SLAM map-building task. Still alternatively, the computing device 1102 may receive a description of an entirely virtual world.

A surface reconstruction component 1114 identifies surfaces in the AR environment based on image information provided by the video cameras, and/or the depth camera system, and/or the map provided by the map processing component 1110. The surface reconstruction component 1114 can then add information regarding the identified surfaces to the world information provided in the data store 1112.

In one approach, the surface reconstruction component 1114 can identify principal surfaces in a scene by analyzing a 2D depth map captured by the depth camera system at a current time, relative to the current location of the user 102. For instance, the surface reconstruction component 1114 can determine that a given depth value is connected to a neighboring depth value (and therefore likely part of a same surface) when the given depth value is no more than a prescribed distance from the neighboring depth value. Using this test, the surface reconstruction component 1114 can distinguish a foreground surface from a background surface. For instance, the surface reconstruction component 1114 can use this test to distinguish the surface of the statue 1004 in FIG. 10 from a wall of a museum (not shown) in which the statue 1004 is located. The surface reconstruction component 1114 can improve its analysis of any single depth map using any machine-trained pattern-matching model and/or image segmentation algorithm.

Alternatively, or in addition, the surface reconstruction component 1114 can use known fusion techniques to reconstruct the three-dimensional shapes of objects in a scene by fusing together knowledge provided by plural depth maps. Illustrative background information regarding the general topic of fusion-based surface reconstruction can be found, for instance, in: Keller, et al., "Real-time 3D Reconstruction in Dynamic Scenes using Point-based Fusion," in Proceedings of the 2013 International Conference on 3D Vision, 2013, pp. 1-8; Izadi, et al., "KinectFusion: Real-time 3D Reconstruction and Interaction Using a Moving Depth Camera," in Proceedings of the 24th Annual ACM Symposium on User Interface Software and Technology, October 2011, pp. 559-568; and Chen, et al., "Scalable Real-time Volumetric Surface Reconstruction," ACM Transactions on Graphics (TOG), Vol. 32, Issue 4, July 2013, pp. 113-1 to 113-10.

Additional information on the general topic of surface reconstruction can be found in: U.S. Patent Application No. 20110109617 to Snook, et al., published on May 12, 2011, entitled "Visualizing Depth"; U.S. Patent Application No. 20150145985 to Gourlay, et al., published on May 28, 2015, entitled "Large-Scale Surface Reconstruction that is Robust Against Tracking and Mapping Errors"; U.S. Patent Application No. 20130106852 to Woodhouse, et al., published on May 2, 2013, entitled "Mesh Generation from Depth Images"; U.S. Patent Application No. 20150228114 to Shapira, et al., published on Aug. 13, 2015, entitled "Contour Completion for Augmenting Surface Reconstructions"; U.S. Patent Application No. 20160027217 to da Veiga, et al., published on Jan. 28, 2016, entitled "Use of Surface Reconstruction Data to Identity Real World Floor"; U.S. Patent Application No. 20160110917 to Iverson, et al., published on Apr. 21, 2016, entitled "Scanning and Processing Objects Into Tree-Dimensional Mesh Models"; U.S. Patent Application No. 20160307367 to Chuang, et al., published on Oct. 20, 2016, entitled "Raster-Based Mesh Decimation"; U.S. Patent Application No. 20160364907 to Schoenberg, published on Dec. 15, 2016, entitled "Selective Surface Mesh Regeneration for 3-Dimensional Renderings"; and U.S. Patent Application No. 20170004649 to Romea, et al., published on Jan. 5, 2017, entitled "Mixed Three Dimensional Scene Reconstruction from Plural Surface Models."

A scene presentation component 1116 can use known graphics pipeline technology to produce a three-dimensional (or two-dimensional) representation of the AR environment. The scene presentation component 1116 generates the representation based at least on virtual content provided by an invoked application, together with the world information in the data store 1112. The graphics pipeline technology can include vertex processing, texture processing, object clipping processing, lighting processing, rasterization, etc. Overall, the graphics pipeline technology can represent surfaces in a scene using meshes of connected triangles or other geometric primitives. Background information regarding the general topic of graphics processing is described, for instance, in Hughes, et al., Computer Graphics: Principles and Practices, Third Edition, Adison-Wesley publishers, 2014. When used in conjunction with an HMD, the scene processing component 1116 can also produce images for presentation to the left and rights eyes of the user 102, to produce the illusion of depth based on the principle of stereopsis.

One or more output devices 1118 provide a representation of the AR environment 1120. The output devices 1118 can include any combination of display devices, including a liquid crystal display panel, an organic light emitting diode panel (OLED), a digital light projector, etc. In an augmented-reality experience, the output devices 1118 can include a semi-transparent display mechanism. That mechanism provides a display surface on which virtual objects may be presented, while simultaneously allowing the user 102 to view the physical environment 1106 "behind" the display device. The user 102 perceives the virtual objects as being overlaid on the physical environment 1106 and integrated with the physical environment 1106. In a full virtual-reality experience (and in some AR experiences), the output devices 1118 can include an opaque (non-see-through) display mechanism.

The output devices 1118 may also include one or more speakers. The speakers can provide known techniques (e.g., using a head-related transfer function (HRTF)) to provide directional sound information, which the user 102 perceives as originating from a particular location within the physical environment 1106.

Figure 12:
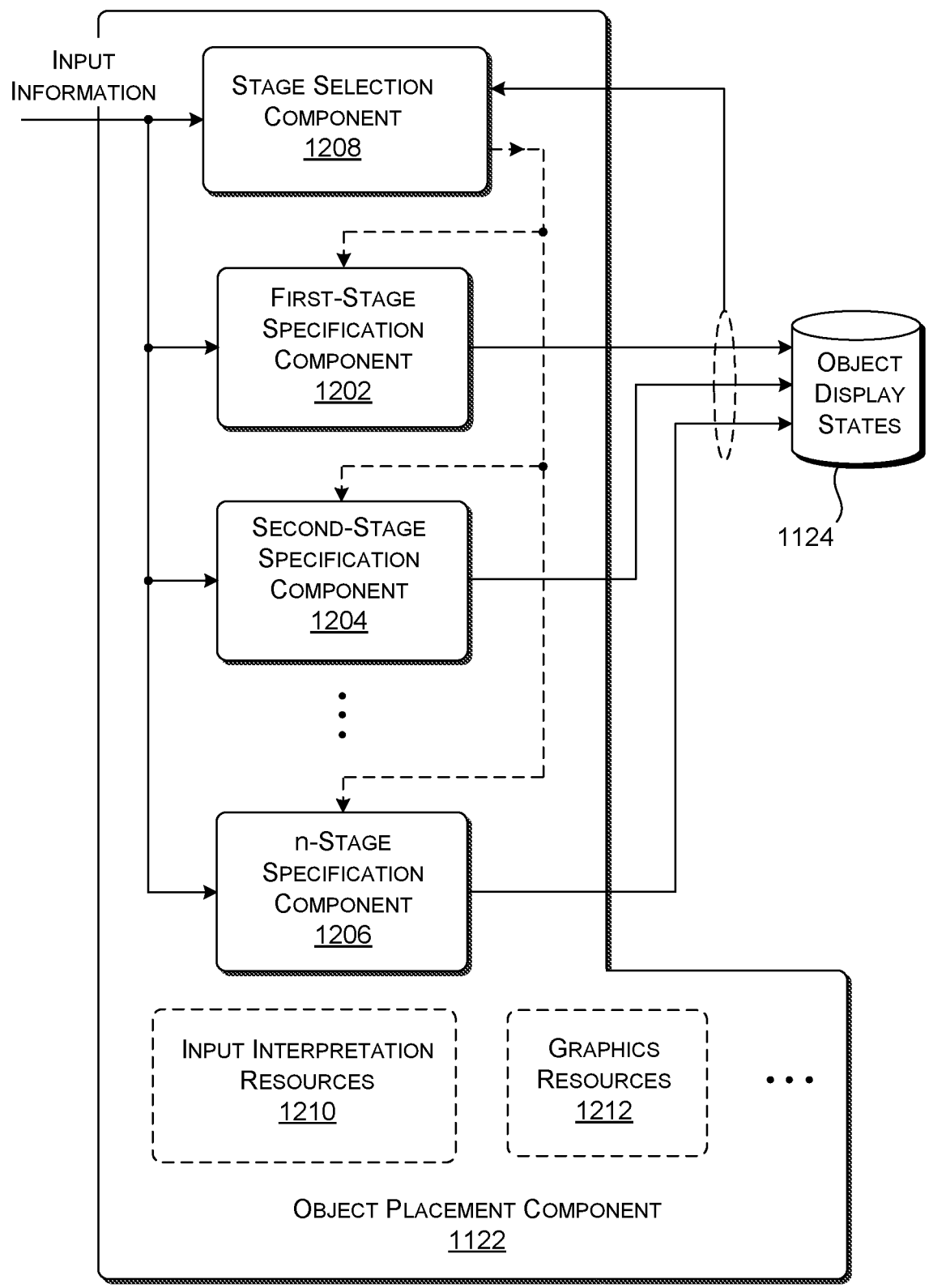
FIG. 12 shows one implementation of an object placement component, which is an element of the computing device of claim 11.

An object placement component 1122 assists the user 102 in placing a virtual object in the AR environment. For instance, the object placement component 1122 provides the user experiences described in Section A with reference to FIGS. 1-9. FIG. 12 (described below) provides further information regarding one implementation of the object placement component 1122.

A data store 1124 stores object display states defined by the object placement component 1122. As described above, each object display state defines various properties of a virtual object; those properties collectively govern the object's placement and appearance in the AR environment.

The computing device 1102 can include a collection of local applications 1126, stored in a local data store. Each local application can perform any function. For example, an illustrative local application can perform a game-related function. For instance, that local application can integrate a machine-generated virtual character into the physical environment 1106.

A communication component 1128 allows the computing device 1102 to interact with remote resources 1130. Generally, the remote resources 1130 can correspond to one or more remote computer servers, and/or one or more user devices (e.g., one or more remote HMDs operated by other users), and/or other kind(s) of computing devices. The computing device 1102 may interact with the remote resources 1130 via a computer network 1132. The computer network 1132, in turn, can correspond to a local area network, a wide area network (e.g., the Internet), one or more point-to-point links, etc., or any combination thereof. The communication component 1128 itself may correspond to a network card or other suitable communication interface mechanism.

In one case, the computing device 1102 can access remote computing logic to perform any function(s) described above as being performed by the computing device 1102. For example, the computing device 1102 can offload the task of building a map (described above as being performed by the map processing component 1110) to the remote computing logic, e.g., where the remote computing logic may correspond to a cloud-computing platform implemented by plural remote computer servers. The computing device 1102 may use this strategy to expedite the execution of certain data-intensive tasks, and/or to reduce the complexity of the computing device 1102.

In another case, the computing device 1102 can access a remote computer server to download a new application, or to interact with a remote application (without necessarily downloading it).

FIG. 12 shows one implementation of the object placement component 1122, introduced with respect to FIG. 11. The object placement component 1122 receives input information from the input processing engine 1108 and/or directly from the input devices 1104. The object placement component 1122 outputs an object display state that defines the placement (and/or other properties) of a virtual object within the AR environment. As described above, the object display state is composed of a collection of dimension values.

In some cases, the object placement component 1122 includes a collection of specification components (1202, 1204, . . . , 1206) that implement the respective stages by which an object display state is defined. For example, with reference to Scenario A described above, a first-stage specification component 1202 can interact with the user 102 to receive the user's selection of a point on a selected surface in the AR environment. A second-stage specification component 1204 can interact with the user 102 to receive an elevation value that specifies the distance of a virtual object from the baseline surface specified by the first-stage specification component 1202. The first-stage specification component 1202 and the second-stage component 1204 together yield value information that specifies the x, y, and z placement of the virtual object in the AR environment. A third-stage component 1206 can interact with the user 102 to receive the user's selection of a size value.

A stage selection component 1208 determines which stage specification component should be invoked at a given time. In one case, the stage selection component 1208 activates an introductory stage specification component upon receiving an explicit command from the user 102 to do so. Thereafter, the stage selection component 1208 can consult pre-stored sequence information to determine a sequence of subsequent specification components to be invoked. For example, the stage selection component 1208 can consult the pre-stored sequence information to determine that the second-stage specification component 1204 should be invoked, following the completion of the task performed by the first-stage specification component 1202. In certain cases, the stage selection component 1208 can also receive one or more commands from the user 102 that govern the order in which the stage specification components are invoked. For example, after the user 102 specifies the x, y, z placement of a virtual object, the stage selection component 1208 can receive an explicit instruction from the user 102 that indicates whether the user 102 wishes to: (1) change the size of the virtual object; or (2) rotate the virtual object about a specified axis; or (3) terminate the placement process.

In one implementation, each stage specification component relies on self-contained logic to perform its respective tasks. In another implementation, two or more stage specification components may rely, in part, on shared resources to perform their respective tasks. For example, two or more stage specification components may rely on shared input interpretation resources 1210 and/or shared graphics resources 1212 to perform their respective tasks. The shared input interpretation resources 1210 provide logic for use in interpreting the input information supplied to the object placement component 1122. The shared graphics resources 1212 provide logic for use in providing various guides. For example, the stage specification components that deliver the experiences shown in FIGS. 4 and 5 can use a shared program that, when executed, displays the illustrated guides (402, 502).

Figure 13:
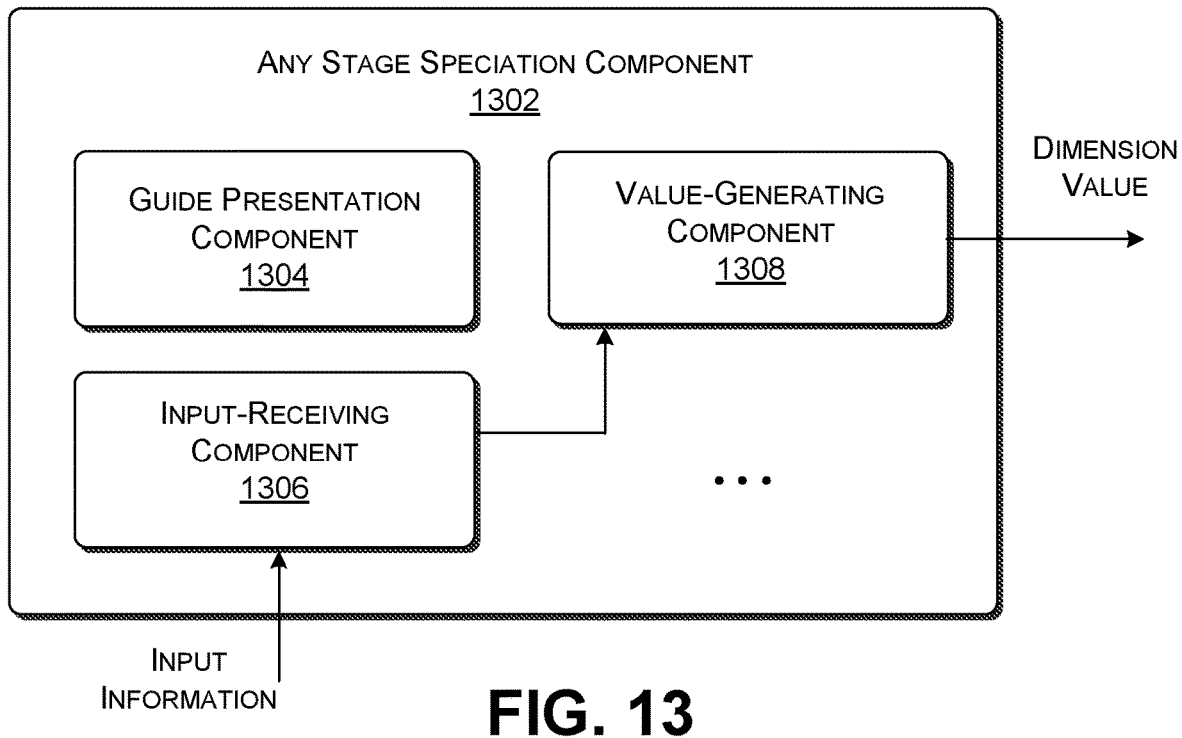
FIG. 13 shows one implementation of a stage specification component, which is an element of the object placement component of FIG. 12.

FIG. 13 shows one implementation of a stage specification component 1302. The stage specification component 1302 includes a guide presentation component 1304 for displaying any type of guide described above, such as the grid 202 shown in FIG. 2, the line 302 shown in FIG. 3, the size-adjustment guide 402 shown in FIG. 4, the rotation-adjustment guide 502 shown in FIG. 5, and so on. In general, a guide provides assistance to the user 102 in selecting a value in an unambiguous manner.

An input-receiving component 1306 receives input information provided by the input processing engine 1108 and/or the input devices 1104, e.g., in response to the user's interaction with the guide provided by the guide presentation component 1304.

A value-generating component 1308 generates value information in response to the input information received by the input-receiving component 1306. For example, upon the user's selection of the first point 112 in FIG. 2, the value-generating component 1308 can identify the x, y, and z coordinates of that point, together with information that identifies the surface to which the point 112 belongs (corresponding to the driveway 110).

FIG. 14 shows one implementation of the input processing engine 1108. The input processing engine 1108 can include a gaze detection engine 1402 for interpreting the gaze of the user 102. In one approach, the gaze detection engine 1402 identifies the direction in which the user's eyes and/or head are pointed based on input signals provided by the gaze-tracking system. The gaze detection engine 1402 then projects a ray into the AR environment in the identified direction of the user's gaze. The gaze detection engine 1402 then identifies the location at which the ray intersects a surface within the AR environment. For example, assume that the surface reconstruction component 1114 determines that the depth values associated with the driveway 110 form an integral surface. The gaze detection engine 1402 can determine the location at which the ray cast the user's gaze intersects that integral surface, e.g., by performing a graphical ray-casting operation.

A body-movement detection engine 1404 determines whether the user 102 has performed a telltale bodily gesture. The body-movement detection engine 1404 can perform this task by comparing image information captured by the input devices 1104 with pre-stored patterns associated with the particular gestures. Background information regarding gesture recognition technology can be found, for instance, in: U.S. Pat. No. 7,996,793 to Latta, et al., published on Aug. 9, 2011, entitled "Gesture Recognizer System Architecture," and U.S. Application No. 20120162065 to Tossell, et al., published on Jun. 28, 2012, entitled "Skeletal Joint Recognition and Tracking System."

A voice command recognition engine 1406 interprets the user's voice commands. The voice command recognition engine 1406 can use any technology for performing this task, such as a neural network or a Hidden Markov Model (HMM). Such a model maps voice input signals to a classification result; the classification result identifies the command spoken by the user 102, if any.

A controller input detection engine 1408 interprets control signals provided by a controller, such as the controller 1010 shown in FIG. 10. For example, the controller input detection engine 1408 can compare the received control signals to pre-stored control signatures, associated with particular gestures or commands.

C. Illustrative Process

Figure 15:
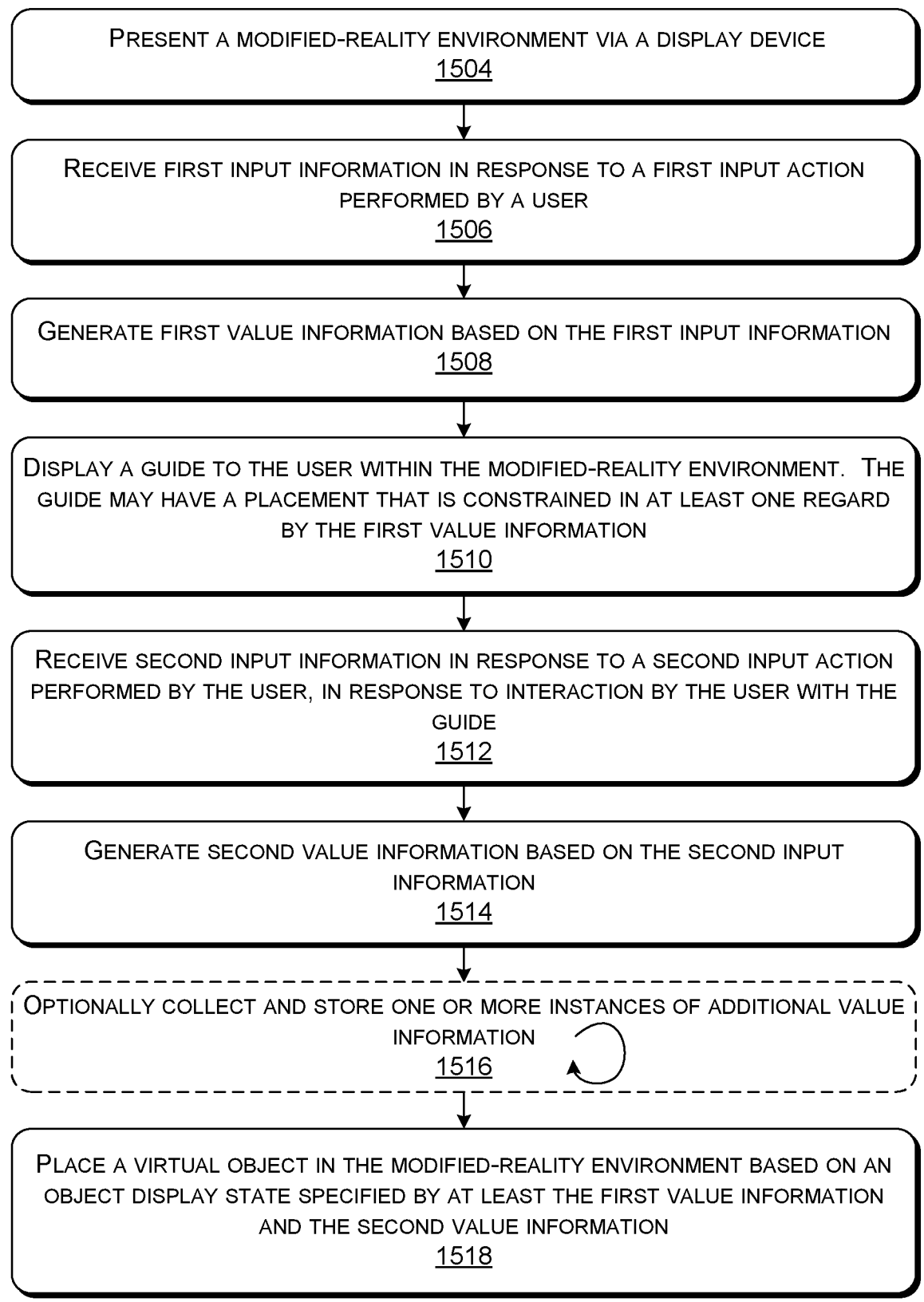
FIG. 15 shows a process that describes one manner of operation of the computing device of FIG. 11.
Figure 16:
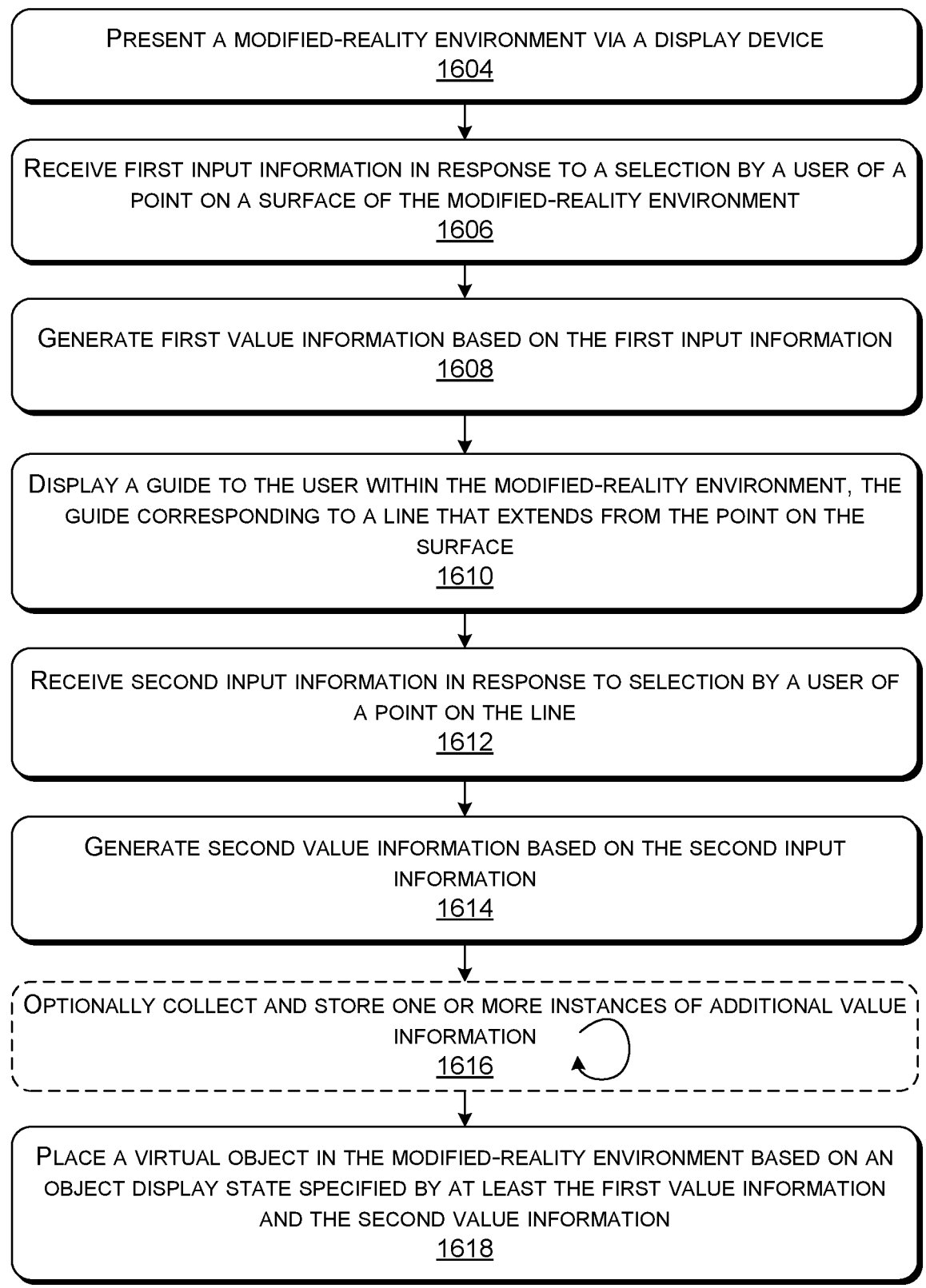
FIG. 16 shows another process that describes one manner of operation of the computing device of FIG. 11. That is, the process of FIG. 16 represents one instantiation of the more general process of FIG. 15.

FIGS. 15 and 16 show processes (1502, 1602) that explain the operation of the computing device 1102 of Sections B in flowchart form. Since the principles underlying the operation of the computing device 1102 have already been described in Section B, certain operations will be addressed in summary fashion in this section. As noted in the prefatory part of the Detailed Description, each flowchart is expressed as a series of operations performed in a particular order. But the order of these operations is merely representative, and can be varied in any manner.

FIG. 15 shows a process 1502 for placing a virtual object in a modified-reality environment, such as an AR environment. In block 1504, the computing device 1102 presents the modified-reality environment via a display device. In block 1506, the computing device 1102 receives first input information in response to a first input action performed by the user 102. In block 1508, the computing device generates first value information based on the first input information. In block 1510, the computing device 1102 displays a guide to the user 102 within the modified-reality environment. In one implementation, the guide has a placement that is constrained in at least one regard by the first value information. In block 1512, the computing device 1102 receives second input information in response to a second input action performed by the user 102, in response to interaction by the user 102 with the guide. In block 1514, the computing device 1102 generates second value information based on the second input information. In block 1516, the computing device 1102 optionally collects one or more instances of additional value information, e.g., by repeating blocks 1512 and 1514 at least one time. In block 1518, the computing device 1102 places a virtual object in the modified-reality environment based on an object display state specified by at least the first value information and the second value information.

Note that FIG. 15 indicates that the terminal operation of the process 1502 (block 1518) corresponds to the placement of a virtual object. But FIG. 15 is meant to broadly encompass any scenario in which the virtual object appears at any stage. For instance, FIG. 15 encompasses the scenario of FIGS. 1-6 in which the computing device 1102 first positions the virtual object 114 at a first selected point on a selected plane, and thereafter elevates the virtual object 114 to a second selected point above the plane. In other words, the process 1502 is not meant to suggest that the virtual object 114 appears only at the end of the process 1502.

FIG. 16 shows a process 1602 that represents one instantiation of the process 1502 of FIG. 15. In block 1604, the computing device 1102 presents a modified-reality environment via a display device. In block 1606, the computing device receives first input information in response to a selection by a user 102 of a point on a surface of the modified-reality environment. In block 1608, the computing device 1102 generates first value information based on the first input information. In block 1610, the computing device 1102 displays a guide to the user 102 within the modified-reality environment, the guide corresponding to a line that extends from the point on the surface. In block 1612, the computing device 1102 receives second input information in response to selection by a user 102 of a point on the line. In block 1614, the computing device generates second value information based on the second input information. In block 1616, the computing device 1102 optionally collects one or more instances of additional value information, e.g., by repeating blocks 1612 and 1614 at least one time. In block 1618, the computing device 1102 places a virtual object in the modified-reality environment based on an object display state specified by at least the first value information and the second value information.

Note that the same point of clarification described above with respect to FIG. 15 applies with equal force to the process 1602 of FIG. 16.

D. Representative Computing Functionality

Figure 17:
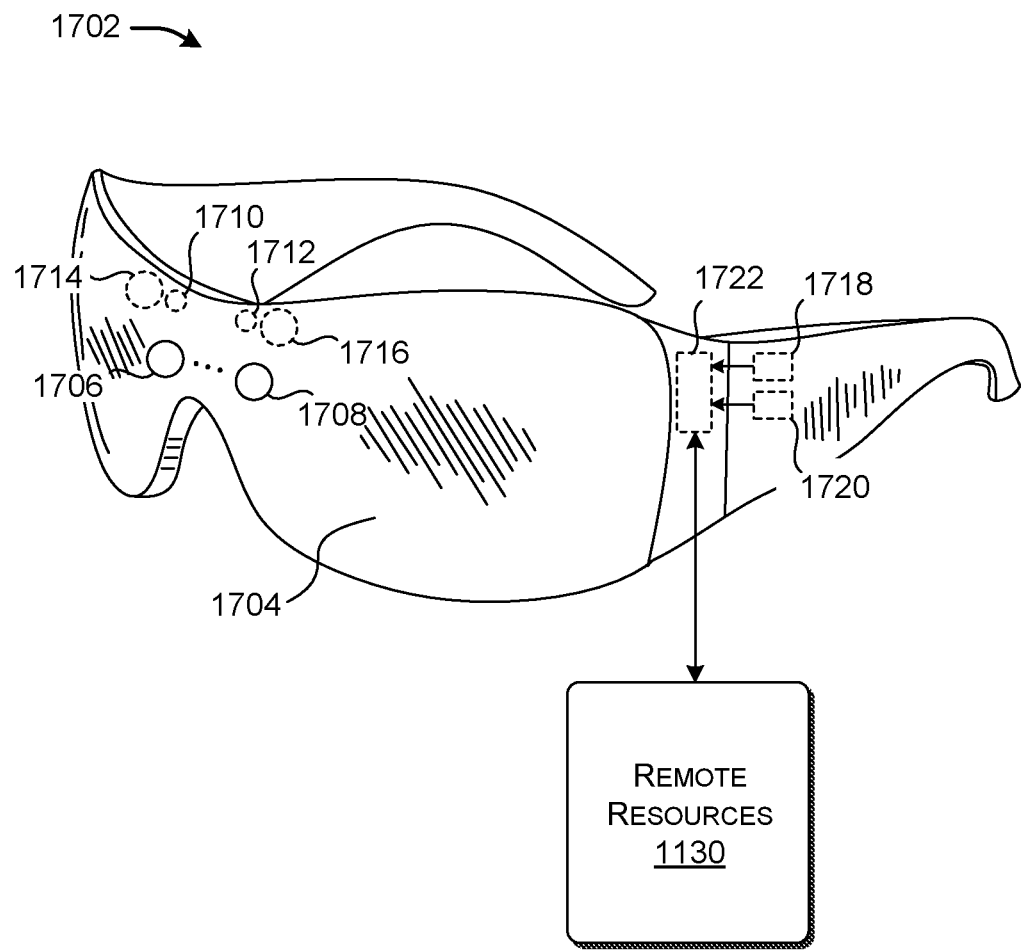
FIG. 17 shows a head-mounted display (HMD), which can be used to implement at least parts of the computing device of FIG. 11.

FIG. 17 shows a head-mounted display (HMD) 1702, which can be used to implement at least parts of the computing device 1102 of FIG. 11. The HMD 1702 includes a head-worn frame that houses or otherwise affixes a see-through display device 1704. Or when used in a fully immersive environment, the display device 1704 can include an opaque (non-see-through) display device. Waveguides (not shown) or other image information conduits direct left-eye images to the left eye of the user 102 and direct right-eye images to the right eye of the user 102, to overall create the illusion of depth through the effect of stereopsis. Although not shown, the HMD 1702 can also include speakers for delivering sounds to the ears of the user 102.

The HMD 1702 can include any environment-facing cameras, such as representative environment-facing cameras 1706 and 1708. The cameras (1706, 1708) can include RGB cameras, a depth camera system, etc. While FIG. 17 shows only two cameras (1706, 1708), the HMD 1702 can include any number of cameras of different camera type(s). Although not shown, the depth camera system also includes an illumination source which directs electromagnetic radiation into the environment.

The HMD 1702 can include an inward-facing gaze-tracking system. For example, the inward-facing gaze-tracking system can include light sources (1710, 1712) for directing light onto the eyes of the user 102, and cameras (1714, 1716) for detecting the light reflected from the eyes of the user 102.

The HMD 1702 can also include other input mechanisms, such as one or more microphones 1718, an inertial measurement unit (IMU) 1720, etc. The IMU 1720, in turn, can include one or more accelerometers, one or more gyroscopes, one or more magnetometers, etc., or any combination thereof.

A controller 1722 can include logic for performing any of the tasks described above in FIG. 11. The controller 1722 may optionally interact with the remote resources 1130 via the communication component 1128 (shown in FIG. 11).

Figure 18:
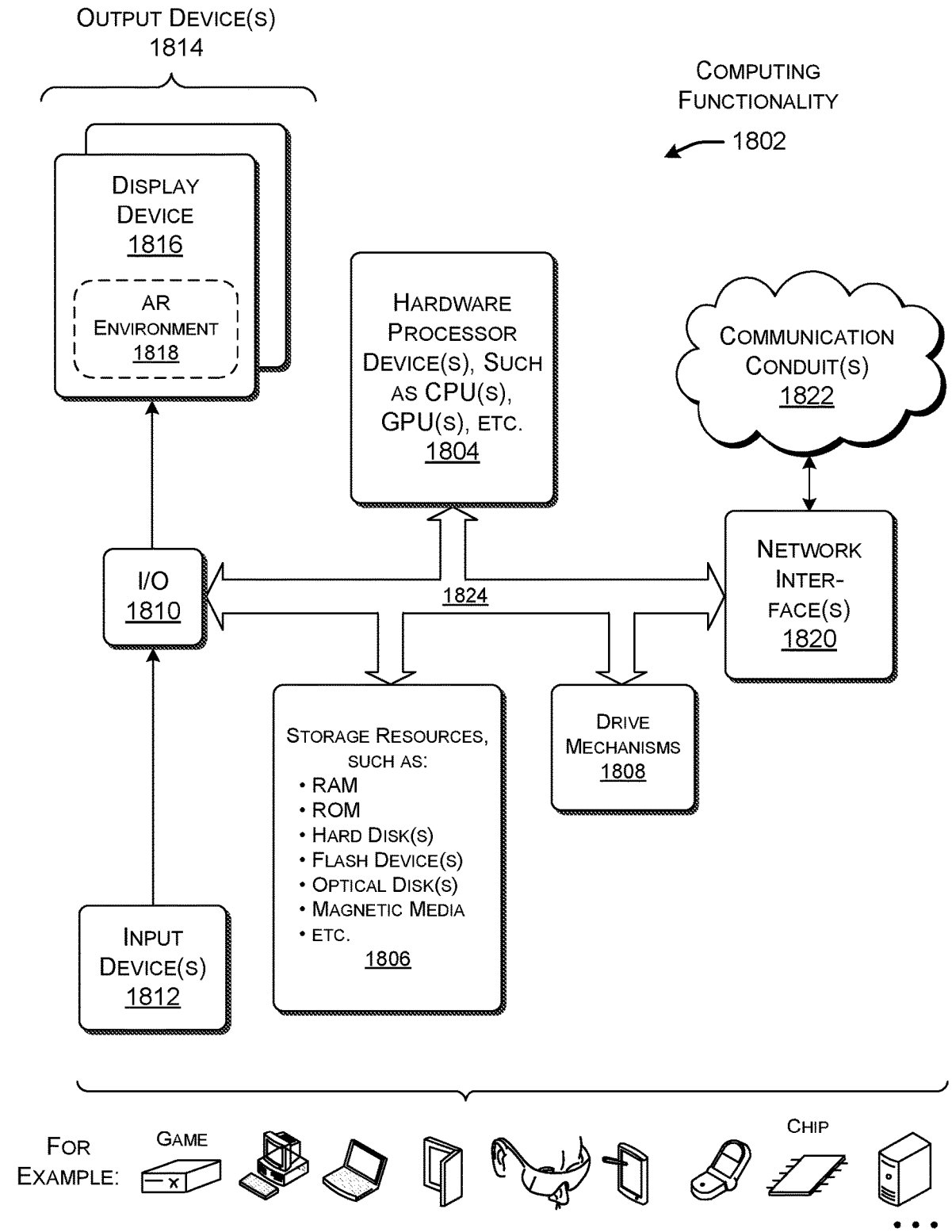
FIG. 18 shows illustrative computing functionality that can be used to implement any aspect of the features shown in the foregoing drawings.

FIG. 18 more generally shows computing functionality 1802 that can be used to implement any aspect of the mechanisms set forth in the above-described figures. For instance, the type of computing functionality 1802 shown in FIG. 18 can be used to implement the HMD 1702 of FIG. 17, or, more generally, the computing device 1102 of FIG. 11. In all cases, the computing functionality 1802 represents one or more physical and tangible processing mechanisms.

The computing functionality 1802 can include one or more hardware processor devices 1804, such as one or more central processing units (CPUs), and/or one or more graphics processing units (GPUs), and so on. The computing functionality 1802 can also include any storage resources (also referred to as computer-readable storage media or computer-readable storage medium devices) 1806 for storing any kind of information, such as machine-readable instructions, settings, data, etc. Without limitation, for instance, the storage resources 1806 may include any of RAM of any type(s), ROM of any type(s), flash devices, hard disks, optical disks, and so on. More generally, any storage resource can use any technology for storing information. Further, any storage resource may provide volatile or non-volatile retention of information. Further, any storage resource may represent a fixed or removable component of the computing functionality 1802. The computing functionality 1802 may perform any of the functions described above when the hardware processor device(s) 1804 carry out computer-readable instructions stored in any storage resource or combination of storage resources. For instance, the computing functionality 1802 may carry out computer-readable instructions to perform each block of the processes (1502, 1602) described in Section C. The computing functionality 1802 also includes one or more drive mechanisms 1808 for interacting with any storage resource, such as a hard disk drive mechanism, an optical disk drive mechanism, and so on.

The computing functionality 1802 also includes an input/output component 1810 for receiving various inputs (via input devices 1812), and for providing various outputs (via output devices 1814). Illustrative input devices and output devices were described above in the context of the explanation of FIG. 11. For instance, the input devices 1812 can include any combination of video cameras, a depth camera system, microphones, an IMU, etc. The output devices 1814 can include a display device 1816 that presents an AR environment 1818, speakers, etc. The computing functionality 1802 can also include one or more network interfaces 1820 for exchanging data with other devices via one or more communication conduits 1822. One or more communication buses 1824 communicatively couple the above-described components together.

The communication conduit(s) 1822 can be implemented in any manner, e.g., by a local area computer network, a wide area computer network (e.g., the Internet), point-to-point connections, etc., or any combination thereof. The communication conduit(s) 1822 can include any combination of hardwired links, wireless links, routers, gateway functionality, name servers, etc., governed by any protocol or combination of protocols.

Alternatively, or in addition, any of the functions described in the preceding sections can be performed, at least in part, by one or more hardware logic components. For example, without limitation, the computing functionality 1802 (and its hardware processor(s)) can be implemented using one or more of: Field-programmable Gate Arrays (FPGAs); Application-specific Integrated Circuits (ASICs); Application-specific Standard Products (ASSPs); System-on-a-chip systems (SOCs); Complex Programmable Logic Devices (CPLDs), etc. In this case, the machine-executable instructions are embodied in the hardware logic itself.

The following summary provides a non-exhaustive list of illustrative aspects of the technology set forth herein.

According to a first aspect, a method, implemented by one or more computing devices, is described for placing a virtual object in a modified-reality environment. The method includes: presenting the modified-reality environment via a display device; receiving first input information in response to a first input action performed by a user; generating first value information based on the first input information; displaying a guide to the user within the modified-reality environment; receiving second input information in response to a second input action performed by the user, in response to interaction by the user with the guide; generating second value information based on the second input information; and placing a virtual object in the modified-reality environment based on an object display state specified by at least the first value information and the second value information.

According to a second aspect, the input information is received from an input processing engine, and wherein the input processing engine includes one or more of: a gaze detection engine configured to project a ray defined by a gaze of the user into the modified-reality environment; and/or a voice recognition engine configured to interpret a voice command issued by the user; and/or a body-movement detection engine configured to interpret a bodily gesture made by the user based on image information that captures the bodily gesture; and/or a controller input engine configured to interpret a control signal emitted by a controller operated by the user.

According to a third aspect, the method further includes, prior to receiving the first input information, displaying an initial guide to a user within the modified-reality environment. The first input information is received in response to interaction by the user with the initial guide. In one case, the initial guide corresponds to a grid that is displayed over a surface in the modified-reality environment. In another case, the initial guide corresponds to a cursor that is displayed on the surface.

According to a fourth aspect, the guide has a placement that is constrained in at least one regard by the first value information.

According to a fifth aspect, the first input information is received in response to a selection by the user of a point on a selected surface of the modified-reality environment.

According to a sixth aspect, the guide corresponds to a line that extends from a first point in the modified-reality environment, the first point being specified by the first value information. The second input information is received in response to selection by the user of a second point that lies on the line.

According to a seventh aspect, the first point lies on a surface of the modified-reality environment, and the line is normal to the surface at the first point.

According to an eighth aspect, the method further includes restricting possible selections by the user to points along the line.

According to a ninth aspect, the method includes repeating the method by collecting an instance of additional input information by: presenting an additional guide; receiving an instance of additional input information in response to interaction by the user with the additional guide; and generating the instance of additional value information in response to the instance of additional input information.

According to a tenth aspect, the instance of additional value information governs a size of the virtual object in the modified-reality environment.

According to an eleventh aspect, the instance of additional value information governs a rotation of the virtual object in the modified-reality environment with respect to at least one axis of rotation.

According to a twelfth aspect, one additional guide corresponds to a control element having a range of selection points along an axis. An instance of additional input information is received in response to selection by the user of one of the selection points that lie on the axis.

According to a thirteenth aspect, the selection point that is selected governs a rate of change of some aspect of the virtual object.

According to a fourteenth aspect, at least one computing device is described for placing a virtual object in a modified-reality environment. The computer device(s) includes: a scene presentation component configured to present the modified-reality environment via a display device; and an input processing engine configured to: receive input signals from a user in response to input actions taken by a user while engaging the modified-reality environment; and process those input signals to provide input information. The computer device(s) also includes a first-stage specification component configured to: receive first input information in response to a first input action performed by the user, the first input information being provided by the input processing engine; and generate first value information based on the first input information. The computer device(s) also includes a second-stage specification component configured to: display a guide to the user within the modified-reality environment, the guide having a placement that is constrained in at least one regard by the first value information; receive second input information in response to a second input action performed by the user, in response to interaction by the user with the guide, the second input information being provided by the input processing engine; and generate second value information based on the second input information. The scene presentation component is configured to place a virtual object in the modified-reality environment based on an object display state specified by at least the first value information and the second value information.

According to a fifteenth aspect, the first-stage specification component is further configured to, prior to receiving the first input information, display an initial guide to a user within the modified-reality environment, wherein the first-stage specification component is configured to receive the first input information in response to interaction by the user with the initial guide.

According to a sixteenth aspect, the first-stage specification component is configured to receive the first input information based on a selection by the user of a point on a selected surface of the modified-reality environment.

According to a seventeenth aspect, the guide (of the fifteenth aspect) corresponds to a line that extends from a first point in the modified-reality environment, the first point being specified by the first value information, and the second-stage specification component is configured to receive the second input information in response to selection by the user of a second point that lies on the line.

According to an eighteenth aspect, the computer device(s) further includes at least one additional specification component, each of which is configured to: present an additional guide; receive at an instance of additional input information in response to interaction by the user with the additional guide; and generate an instance of additional value information in response to the instance of additional input information.

According to a nineteenth aspect, the instance of additional value information (referenced in the eighteenth aspect) governs a size or rotation of the virtual object in the modified-reality environment.

According to a twentieth aspect, a computer-readable storage medium is described for storing computer-readable instructions. The computer-readable instructions, when executed by one or more processor devices, perform a method that includes: presenting a modified-reality environment via a display device; receiving first input information in response to a selection by a user of a point on a surface of the modified-reality environment; generating first value information based on the first input information; displaying a guide to the user within the modified-reality environment, the guide corresponding to a line that extends from the point on the surface; receiving second input information in response to selection by a user of a point on the line; generating second value information based on the second input information; and placing a virtual object in the modified-reality environment based on an object display state specified by at least the first value information and the second value information.

A twenty-first aspect corresponds to any combination (e.g., any permutation or subset that is not logically inconsistent) of the above-referenced first through twentieth aspects.

A twenty-second aspect corresponds to any method counterpart, device counterpart, system counterpart, means-plus-function counterpart, computer-readable storage medium counterpart, data structure counterpart, article of manufacture counterpart, graphical user interface presentation counterpart, etc. associated with the first through twenty-first aspects.

In closing, the functionality described herein can employ various mechanisms to ensure that any user data is handled in a manner that conforms to applicable laws, social norms, and the expectations and preferences of individual users. For example, the functionality can allow a user to expressly opt in to (and then expressly opt out of) the provisions of the functionality. The functionality can also provide suitable security mechanisms to ensure the privacy of the user data (such as data-sanitizing mechanisms, encryption mechanisms, password-protection mechanisms, etc.).

Further, the description may have set forth various concepts in the context of illustrative challenges or problems. This manner of explanation is not intended to suggest that others have appreciated and/or articulated the challenges or problems in the manner specified herein. Further, this manner of explanation is not intended to suggest that the subject matter recited in the claims is limited to solving the identified challenges or problems; that is, the subject matter in the claims may be applied in the context of challenges or problems other than those described herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, implemented by one or more computing devices, the method comprising:
   receiving first input information in response to a first input action performed by a user when engaging a modified-reality environment;
   generating first placement information based at least on the first input information;
   displaying a guide to the user within the modified-reality environment, the guide being located in the modified-reality environment based at least on the first placement information;
   moving a virtual object along the guide in response to user input received while the guide is displayed and restricting movement of the virtual object to points along the guide;
   receiving second input information in response to a second input action performed by the user;
   generating second placement information based at least on the second input information, the second placement information specifying a particular point on the guide displayed in the modified-reality environment at which to place the virtual object; and
   placing the virtual object in the modified-reality environment at the particular point on the guide displayed in the modified-reality environment, as specified by the second placement information.

2. The method of claim 1, further comprising receiving at least one of the first input information or the second input information by one or more of:
   projecting a ray defined by a gaze of the user into the modified-reality environment;
   interpreting a voice command issued by the user;
   interpreting a bodily gesture made by the user based at least on image information that captures the bodily gesture; and/or
   interpreting a control signal emitted by a controller operated by the user.

3. The method of claim 1, further comprising:
   prior to receiving the first input information, displaying a grid within the modified-reality environment,
   wherein the first input information is received in response to interaction by the user with the grid.

4. The method of claim 1, further comprising:
   based at least on the first placement information, placing the virtual object at an initial position on the guide in the modified-reality environment prior to receiving the second input information.

5. The method of claim 1, further comprising:
   receiving the first input information in response to a selection by the user of another point on a selected surface of the modified-reality environment.

6. The method of claim 1, further comprising:
   displaying the guide as a straight line that extends from a first point in the modified-reality environment, the first point being specified by the first placement information, and
   receiving the second input information in response to selection by the user of a second point that lies on the straight line, the selection of the second point occurring after the virtual object has been moved along the straight line in response to the user input,
   wherein the second point is the particular point on the guide where the virtual object is placed.

7. The method of claim 6,
   wherein the first point lies on a surface of the modified-reality environment, and
   wherein the straight line is normal to the surface at the first point.

8. The method of claim 1, further comprising:
   presenting an additional guide;
   receiving an instance of additional input information in response to interaction by the user with the additional guide;
   generating an instance of additional value information in response to the instance of additional input information; and
   governing a visual characteristic of the virtual object based at least on the instance of additional value information.

9. The method of claim 8, the visual characteristic being a size of the virtual object.

10. The method of claim 8, the visual characteristic being a rotation of the virtual object in the modified-reality environment with respect to at least one axis of rotation.

11. The method of claim 8,
    wherein the additional guide corresponds to a control element having a range of selection points along an axis, and
    wherein the instance of additional input information is received in response to selection by the user of a particular selection point that lies on the axis.

12. The method of claim 11, wherein the particular selection point governs a rate of change of the visual characteristic of the virtual object.

13. One or more computing devices comprising:
    a hardware processor; and
    storage storing machine-readable instructions which, when executed by the hardware processor, cause the hardware processor to:
    present a modified-reality environment for display on a display device;
    receive first input information in response to a first input action performed by a user while engaging the modified-reality environment;
    generate first placement information based at least on the first input information;
    present a guide to the user within the modified-reality environment, the guide being located in the modified-reality environment based at least on the first placement information;
    in response to movement inputs received while the guide is presented, move a virtual object along the guide while restricting movement of the virtual object to points along the guide;
    receive second input information in response to a second input action performed by the user in response to interaction by the user with the guide presented in the modified-reality environment;
    generate second placement information based at least on the second input information, the second placement information specifying a particular point on the guide presented in the modified-reality environment at which to place the virtual object; and
    place the virtual object in the modified-reality environment at the particular point on the guide presented in the modified-reality environment, as specified by the second placement information.

14. The one or more computing devices of claim 13, wherein the machine-readable instructions, when executed by the hardware processor, cause the hardware processor to:
    prior to receiving the first input information, present an initial guide within the modified-reality environment and receive the first input information in response to interaction by the user with the initial guide.

15. The one or more computing devices of claim 13, wherein the machine-readable instructions, when executed by the hardware processor, cause the hardware processor to:
receive the first input information based at least on a selection by the user of another point on a selected surface of the modified-reality environment.

16. The one or more computing devices of claim 13, wherein the guide corresponds to a straight line that extends vertically from a first point in the modified-reality environment, the first point being specified by the first placement information, and wherein the second input information designates a second point that lies on the straight line.

17. The one or more computing devices of claim 13, wherein the machine-readable instructions, when executed by the hardware processor, cause the hardware processor to:
present an additional guide within the modified-reality environment;
receive an instance of additional input information in response to interaction by the user with the additional guide;
generate an instance of additional value information in response to the instance of additional input information; and
adjust a visual characteristic of the virtual object based at least on the additional value information.

18. The one or more computing devices of claim 17, wherein the visual characteristic comprises a size or rotation of the virtual object in the modified-reality environment.

19. A computer-readable storage medium storing computer-readable instructions, the computer-readable instructions, when executed by one or more processor devices, causing the one or more processor devices to perform acts comprising:
presenting a modified-reality environment for display;
receiving first input information in response to a first user selection of a first point on a surface of the modified-reality environment;
generating first placement information based at least on the first input information;
presenting a guide within the modified-reality environment, the guide corresponding to a straight line that extends from the first point on the surface;
moving a virtual object along the straight line in response to user input received while the straight line is presented and restricting movement of the virtual object to points along the straight line when moving the virtual object;
receiving second input information in response to a second user selection of a second point on the straight line presented in the modified-reality environment;
generating second placement information based at least on the second input information, the second placement information specifying a position of the virtual object at the second point on the straight line presented in the modified-reality environment; and
placing the virtual object in the modified-reality environment at the second point on the straight line presented in the modified-reality environment.

20. The method of claim 1, further comprising:
after moving the virtual object to the particular point on the guide and placing the virtual object, removing the guide from the modified-reality environment.

21. The method of claim 1, further comprising:
fixing the guide at a specific point along a planar surface in the modified-reality environment, the specific point specified by the first placement information, the guide extending away from the planar surface in a particular direction.

22. The method of claim 21, the particular direction being perpendicular to the planar surface.

* * * * *